US012614238B2

(12) United States Patent
Mohite et al.

(10) Patent No.: US 12,614,238 B2
(45) Date of Patent: Apr. 28, 2026

(54) DYNAMIC VALUE DETERMINATION AND PERFORMANCE BASED ROYALTY CALCULATION OF NON-FUNGIBLE TOKENS CREATED FOR AGRICULTURAL ASSETS

(71) Applicant: Tata Consultancy Services Limited, Mumbai (IN)

(72) Inventors: Jayantrao Mohite, Thane (IN); Dineshkumar Singh, Thane (IN); Suryakant Ashok Sawant, Pune (IN); Sanat Sarangi, Thane (IN); Vaibhav Sadashiv Lonkar, London (GB); Mariappan Sakkan, Chennai (IN); Srinivasu Pappula, Hyderabad (IN); Ajay Mittal, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 32 days.

(21) Appl. No.: 18/785,568

(22) Filed: Jul. 26, 2024

(65) Prior Publication Data

US 2025/0069155 A1     Feb. 27, 2025

(30) Foreign Application Priority Data

Aug. 21, 2023   (IN) .............................. 202321055999

(51) Int. Cl.
| | |
|---|---|
| *G06Q 40/12* | (2023.01) |
| *G06Q 40/04* | (2012.01) |
| *G06Q 50/02* | (2024.01) |

(52) U.S. Cl.
CPC ............. *G06Q 40/12* (2013.12); *G06Q 40/04* (2013.01); *G06Q 50/02* (2013.01); *G06Q 2220/00* (2013.01)

(58) Field of Classification Search
CPC ........ G06Q 40/12; G06Q 40/04; G06Q 50/02; G06Q 2220/00; G06Q 30/018;
(Continued)

(56) References Cited

U.S. PATENT DOCUMENTS

2022/0391868 A1    12/2022   Jaeger et al.

OTHER PUBLICATIONS

Abril, "A proposal for a new model of Land Registry, based on blockchain technology," (2020).
(Continued)

*Primary Examiner* — A. Hunter Wilder
(74) *Attorney, Agent, or Firm* — Finnegan, Henderson, Farabow, Garrett & Dunner, LLP

(57) ABSTRACT

A method and system for dynamic value determination and performance based royalty calculation of non-fungible tokens (NFTs) created for agricultural assets is disclosed. The method enables reliable and authentic ownership tracking and the removal of frauds/biases affecting the valuation of the said asset(s), as all the transactions are recorded and visible to everybody on the platform. Various biases, such as location (or spatial), temporal or human judgment-based biases in the existing valuation systems are removed by having dynamic and performance-based valuation approach proposed in this invention. NFT valuations of farm diary and farm art have hardly been proposed in earlier works. Royalty or reward computations from agricultural NFTs has not been attempted. Thus, the method provides performance or creation-based (creation of IP, Knowledge base, Geographical Indication IP) royalties/rewards for the NFT owner or entities involved in the process.

11 Claims, 7 Drawing Sheets

(58) Field of Classification Search
CPC ........... G06Q 30/0278; G06Q 30/0283; G06Q
50/16; G06Q 30/0206; G06Q 50/18
See application file for complete search history.

(56) References Cited

OTHER PUBLICATIONS

Diogo et al., "Implementation of an economic valuation module in the Land Use Scanner model," (2013).
Nivens et al., "Using Satellite Imagery in Predicting Kansas Farmland Values," Journal of Agriculture and Resource Economics, 27(2):464-480 (2002).
Runge et al., "A result-oriented approach to reward N-efficiency improvements," (2007).

300 receiving a request for at least one of a) valuation of a NFT created for an agricultural asset from among a plurality of NFTs created for a plurality of agricultural assets owned by a current owner, and b) computing a royalty to be received by the current owner and one or more previous owners of the NFT, wherein the plurality of NFTs belong to a plurality of NFT types, and wherein the NFT is tagged as a royalty generating NFT if one or more activities associated with the agricultural asset associated with the NFT are non-consumable in nature ⟋ 302 dynamically generating an attribute tuple (G,E,S) for the NFT, wherein the attribute tuple comprising a geographical attribute (G), an economical attribute (E), and a sustainability attribute recorded for the agricultural asset associated with the NFT, wherein each of the geographical attribute, economical attribute, and a sustainability attribute comprises a plurality of parameters ⟋ 304 assigning an individual score to each parameter available within the geographical attribute, the economical attribute, and the sustainability attribute based on relevancy of an attribute to a NFT type of the NFT and the cropland with which the NFT is associated ⟋ 306 integrating the individual scores for each parameter within the geographical attribute, the economical attribute, and the sustainability attribute to generate an overall score associated with each element (G, E, S) of the attribute tuple ⟋ 308

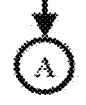

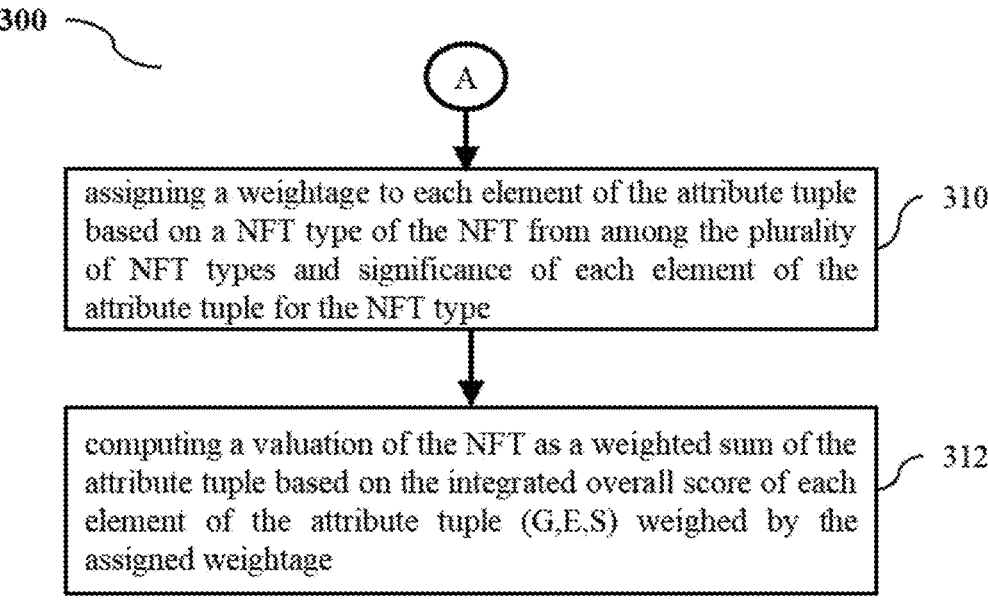

assigning a weightage to each element of the attribute tuple based on a NFT type of the NFT from among the plurality of NFT types and significance of each element of the attribute tuple for the NFT type          310 computing a valuation of the NFT as a weighted sum of the attribute tuple based on the integrated overall score of each element of the attribute tuple (G,E,S) weighed by the assigned weightage          312

FIG. 3B

DYNAMIC VALUE DETERMINATION AND PERFORMANCE BASED ROYALTY CALCULATION OF NON-FUNGIBLE TOKENS CREATED FOR AGRICULTURAL ASSETS

PRIORITY CLAIM

This U.S. patent application claims priority under 35 U.S.C. § 119 to: India Application No. 202321055999, filed on Aug. 21, 2023. The entire contents of the aforementioned application are incorporated herein by reference.

TECHNICAL FIELD

The embodiments herein generally relate to the field of valuation of agricultural assets and, more particularly, to a method and system for dynamic value determination and performance based royalty calculation of non-fungible Tokens (NFTs) created for the agricultural assets.

BACKGROUND

Blockchain is explored for applications across domains. Digitization of physical assets through concepts such as Non-fungible tokens (NFTs), which are assets that have been tokenized via the blockchain is also well known. NFTs are assigned unique identification codes called tokens and metadata that distinguish them from other tokens in the blockchain. This tokenization can be done for entities like arts, real-estate such as house, cropland, and can only have one official owner at a time. NFTs can be traded i.e., ownership rights are transferred and exchanged for money in the secondary market. They are used in various transactions, including buying, and selling, borrowing, and lending and exchange transactions. A fractional NFT (non-fungible token) is a single NFT that's been divided into smaller pieces, allowing multiple investors to gain partial ownership of it.

NFTs have been used to represent agricultural assets or the physical farm assets such as cropland and livestock and the like. Valuation of agricultural assets when agricultural assets are represented via NFTs has been attempted. However, valuations tend to be biased by the physical observations at the time of the observations made by the human valuator, their personal mindset at that moment, the expertise and relevancy of skills of valuation, ethical or emotional factors, etc. that may affect the decision-making ability and hence can lack the continuous time-series based events which would have led to the instantaneous observation. Hence, it will be limited to only one or few instant or discrete data and may lack the complete or true picture of the observed entity or the agriculture product or by-products or entities. Moreover, some of the agricultural assets or products or by-products may be time sensitive, as available for only a season or part of the season. Hence, valuation must also be in sync with the biological lifecycle of such products or assets. In addition to this, valuation is a skilled job and requires expertise, but due to the absence of a structured, standardized, and globally recognized certified valuation process or body of knowledge or professionals especially in the agriculture sector and emerging newer opportunities like NFT and types of agricultural products or by-products such as farm arts, an all-comprehensive methodology is required. There is no defined or standardized method for valuation of the Agri-land and currently, only its location plays the key role. This creates a bias in pricing of the Agri-land for transactions, such as selling/buying, leasing/renting etc. Furthermore, the agricultural (Agri) assets covered under the above valuation approaches were limited. Many progressive farmers have developed unique methods of cultivating the crops, by creating or adopting farm practices and decisions with their or other experiences, which are helping them generate better and sustainable produce. On observing benefits, such practices are also adapted by other farmers in the same or other similar geographical regions to improve their productivity. But the farmer/entity who have developed that farm diary are not getting enough due as there is no tracking about the ownership, or a maintained record or recognition of knowledge they generated, in a transparent manner. Similar to various art/pictures, farm-arts could be generated dynamically depending upon the location or surrounding of the agricultural farm or land, and actual farming operations being carried out. This could be an additional source of income for the farmers. However, there is issues with reliable ownership, or who or how generated the farm-art, with what kind of farm or other transactions, and on which platform to transact, etc., and hence not many farmers are currently encouraged leverage this income generating option.

It can be noted that agriculture is one of the key sectors in India and across the globe. Agricultural lands (Agri-land), also referred to as farmlands or croplands, are traditionally owned by small groups of families, and it is passed on to the next generations. This is applicable across many parts of the world. Over the recent years, contract farming has been adopted by many corporates/organizations and are working with farmers. In such cases, contract farmers are getting the land on lease or rent or buying it from the farmers. However, selling or buying, leasing, or renting of the agricultural land and associated assets and products (farm produce, farm by products such as farm diary, farm art that adds aesthetic view to the farm, etc.) have certain challenges and conventionally has been performed manually. Manual evaluation has its own challenges such as subjective evaluation and so on. Automating Agri-asset valuation to obtain a true valuation approach is technically challenging as capturing agricultural assets related attributes in terms of system parameters is difficult when significance of each attribute may vary based on the context and is itself dynamic in nature.

SUMMARY

Embodiments of the present disclosure present technological improvements as solutions to one or more of the above-mentioned technical problems recognized by the inventors in conventional systems.

For example, in one embodiment, a method for dynamic value determination and performance based royalty calculation of non-fungible Tokens (NFTs) created for the agricultural assets is provided. The method includes receiving via the agricultural asset valuation server, a request for at least one of a) valuation of a NFT created for an agricultural asset from among the plurality of NFTs created for the plurality of agricultural assets owned by a current owner, and b) computing a royalty to be received by the current owner and one or more previous owners of the NFT, wherein the plurality of NFTs belong to a plurality of NFT types. The NFT is tagged as a royalty generating NFT if one or more activities associated with the agricultural asset associated with the NFT are of non-consumable nature.

Further, dynamically generating via the agricultural asset valuation server, an attribute tuple for the NFT, wherein the attribute tuple comprising a geographical attribute (G), an economical attribute (E), and a sustainability attribute recorded the method includes for the agricultural asset associated with the NFT. Each of the geographical attribute, economical attribute, and the sustainability attribute comprises a plurality of parameters.

Further, the method includes assigning via the agricultural asset valuation server, an individual score to each of the plurality of parameters available within the geographical attribute, the economical attribute, and the sustainability attribute based on relevancy of an attribute to a NFT type of the NFT and the cropland with which the NFT is associated.

Further, the method includes integrating via the agricultural asset valuation server, the individual scores for each of the plurality of parameters within the geographical attribute, the economical attribute, and the sustainability attribute to generate an overall score associated with each element G, E, and S of the attribute tuple.

Further, the method includes assigning via the agricultural asset valuation server, a weightage to each element of the attribute tuple based on the NFT type of the NFT from among the plurality of NFT types and significance of each element of the attribute tuple for the NFT type. If the type of NFT is a cropland, each element G, E, and S of the attribute tuple is provided equal significance and the assigned weightage is equally distributed among each element G, E, and S of the attribute tuple. If the type of NFT is a farm produce, element E has highest significance followed by element S and element G of the attribute tuple and assigned weightage decreases from E, S to G elements of the attribute tuple. If the type of NFT is a farm diary, element G and element S of the attribute tuple are provided higher significance as compared to element E and assigned weightage decreases from S, G to E elements of the attribute tuple. If the type of NFT is a farm art, element G is provided highest significance as compared to element E and element S, and assigned weightage is highest to G element and equal to the S and E elements of the attribute tuple.

Furthermore, the method includes computing via the agricultural asset valuation server, a valuation of the NFT as a weighted sum of the attribute tuple based on the integrated overall score of each element G, E and S of the attribute tuple weighed by the assigned weightage.

Further, the method includes performing NFT based trading via the financial transaction server.

Furthermore, the method includes processing via the agricultural asset valuation server, the request to compute performance based royalty, for the NFT, to be distributed among the current owner and the one or more previous owners if the NFT is tagged as the royalty generating NFT. If the type of the NFT is the cropland the royalty is provided to each of the current owner and the one or more previous owners based on an ownership period for the NFT, productivity of the cropland and maintenance of the cropland, use of sustainable practices and a price for which the NFT has been bought. If the type of the NFT is the farm diary the royalty is provided to the current owner based on percentage increase in gains from the agricultural asset associated with the NFT as a result of one or more unique practices as compared to routine practices of working with the agricultural asset. If the type of the NFT is the farm art the royalty is provided statically to an owner of the NFT who is identified as creator of the farm art.

In another aspect, a system for dynamic value determination and performance based royalty calculation of non-fungible Tokens (NFTs) created for the agricultural assets is provided. The system comprises a digital asset server generating a plurality of digital assets for a plurality of agricultural assets, a NFT Digital Exchange server having a NFT wallet for creating a plurality of Non-Fungible Tokens (NFTs) for the plurality of digital assets, an agricultural asset valuation server, a financial transaction server, and a Royalty Estimator Node. Each of the plurality of components comprises: a memory storing instructions; one or more Input/Output (1/O) interfaces; and one or more hardware processors coupled to the memory via the one or more I/O interfaces. The one or more hardware processors are configured by the instructions to receive via the agricultural asset valuation server, a request for at least one of a) valuation of a NFT created for an agricultural asset from among the plurality of NFTs created for the plurality of agricultural assets owned by a current owner, and b) computing a royalty to be received by the current owner and one or more previous owners of the NFT, wherein the plurality of NFTs belong to a plurality of NFT types. The NFT is tagged as a royalty generating NFT if one or more activities associated with the agricultural asset associated with the NFT are of non-consumable nature.

Further, the one or more hardware processors are configured to dynamically generate via the agricultural asset valuation server, an attribute tuple for the NFT, wherein the attribute tuple comprising a geographical attribute (G), an economical attribute (E), and a sustainability attribute recorded for the agricultural asset associated with the NFT. Each of the geographical attribute, economical attribute, and the sustainability attribute comprises a plurality of parameters.

Further, the one or more hardware processors are configured to assign via the agricultural asset valuation server, an individual score to each of the plurality of parameters available within the geographical attribute, the economical attribute, and the sustainability attribute based on relevancy of an attribute to a NFT type of the NFT and the cropland with which the NFT is associated.

Further, the one or more hardware processors are configured to integrate via the agricultural asset valuation server, the individual scores for each of the plurality of parameters within the geographical attribute, the economical attribute, and the sustainability attribute to generate an overall score associated with each element G, E, and S of the attribute tuple.

Further, the one or more hardware processors are configured to assign via the agricultural asset valuation server, a weightage to each element of the attribute tuple based on the NFT type of the NFT from among the plurality of NFT types and significance of each element of the attribute tuple for the NFT type. If the type of NFT is a cropland, each element G, E, and S of the attribute tuple is provided equal significance and the assigned weightage is equally distributed among each element G, E, and S of the attribute tuple. If the type of NFT is a farm produce, element E has highest significance followed by element S and element G of the attribute tuple and assigned weightage decreases from E, S to G elements of the attribute tuple. If the type of NFT is a farm diary, element G and element S of the attribute tuple are provided higher significance as compared to element E and assigned weightage decreases from S, G to E elements of the attribute tuple. If the type of NFT is a farm art, element G is provided highest significance as compared to element E and element S, and assigned weightage is highest to G element and equal to the S and E elements of the attribute tuple.

Furthermore, the one or more hardware processors are configured to; compute via the agricultural asset valuation server, a valuation of the NFT as a weighted sum of the attribute tuple based on the integrated overall score of each element G, E and S of the attribute tuple weighed by the assigned weightage.

Further, the one or more hardware processors are configured to perform NFT based trading via the financial transaction server.

Furthermore, the one or more hardware processors are configured to process via the agricultural asset valuation server, the request to compute performance based royalty, for the NFT, to be distributed among the current owner and the one or more previous owners if the NFT is tagged as the royalty generating NFT. If the type of the NFT is the cropland the royalty is provided to each of the current owner and the one or more previous owners based on an ownership period for the NFT, productivity of the cropland and maintenance of the cropland, use of sustainable practices and a price for which the NFT has been bought. If the type of the NFT is the farm diary the royalty is provided to the current owner based on percentage increase in gains from the agricultural asset associated with the NFT as a result of one or more unique practices as compared to routine practices of working with the agricultural asset. If the type of the NFT is the farm art the royalty is provided statically to an owner of the NFT who is identified as creator of the farm art.

In yet another aspect, there are provided one or more non-transitory machine-readable information storage mediums comprising one or more instructions, which when executed by one or more hardware processors causes a method for dynamic value determination and performance based royalty calculation of non-fungible Tokens (NFTs) created for the agricultural assets.

The method includes receiving via the agricultural asset valuation server, a request for at least one of a) valuation of a NFT created for an agricultural asset from among the plurality of NFTs created for the plurality of agricultural assets owned by a current owner, and b) computing a royalty to be received by the current owner and one or more previous owners of the NFT, wherein the plurality of NFTs belong to a plurality of NFT types. The NFT is tagged as a royalty generating NFT if one or more activities associated with the agricultural asset associated with the NFT are of non-consumable nature.

Further, dynamically generating via the agricultural asset valuation server, an attribute tuple for the NFT, wherein the attribute tuple comprising a geographical attribute (G), an economical attribute (E), and a sustainability attribute recorded the method includes for the agricultural asset associated with the NFT. Each of the geographical attribute, economical attribute, and the sustainability attribute comprises a plurality of parameters.

Further, the method includes assigning via the agricultural asset valuation server, an individual score to each of the plurality of parameters available within the geographical attribute, the economical attribute, and the sustainability attribute based on relevancy of an attribute to a NFT type of the NFT and the cropland with which the NFT is associated.

Further, the method includes integrating via the agricultural asset valuation server, the individual scores for each of the plurality of parameters within the geographical attribute, the economical attribute, and the sustainability attribute to generate an overall score associated with each element G, E, and S of the attribute tuple.

Further, the method includes assigning via the agricultural asset valuation server, a weightage to each element of the attribute tuple based on the NFT type of the NFT from among the plurality of NFT types and significance of each element of the attribute tuple for the NFT type. If the type of NFT is a cropland, each element G, E, and S of the attribute tuple is provided equal significance and the assigned weightage is equally distributed among each element G, E, and S of the attribute tuple. If the type of NFT is a farm produce, element E has highest significance followed by element S and element G of the attribute tuple and assigned weightage decreases from E, S to G elements of the attribute tuple. If the type of NFT is a farm diary, element G and element S of the attribute tuple are provided higher significance as compared to element E and assigned weightage decreases from S, G to E elements of the attribute tuple. If the type of NFT is a farm art, element G is provided highest significance as compared to element E and element S, and assigned weightage is highest to G element and equal to the S and E elements of the attribute tuple.

Furthermore, the method includes computing via the agricultural asset valuation server, a valuation of the NFT as a weighted sum of the attribute tuple based on the integrated overall score of each element G, E and S of the attribute tuple weighed by the assigned weightage.

Further, the method includes performing NFT based trading via the financial transaction server.

Furthermore, the method includes processing via the agricultural asset valuation server, the request to compute performance based royalty, for the NFT, to be distributed among the current owner and the one or more previous owners if the NFT is tagged as the royalty generating NFT. If the type of the NFT is the cropland the royalty is provided to each of the current owner and the one or more previous owners based on an ownership period for the NFT, productivity of the cropland and maintenance of the cropland, use of sustainable practices and a price for which the NFT has been bought. If the type of the NFT is the farm diary the royalty is provided to the current owner based on percentage increase in gains from the agricultural asset associated with the NFT as a result of one or more unique practices as compared to routine practices of working with the agricultural asset. If the type of the NFT is the farm art the royalty is provided statically to an owner of the NFT who is identified as creator of the farm art.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A through 3B (collectively referred as FIG. 3) is a flow diagram illustrating a method for dynamic value determination and performance based royalty calculation of non-fungible Tokens (NFTs) created for the agricultural assets, using the system depicted in FIGS. 1 and 2, in accordance with some embodiments of the present disclosure.

Figure 1:
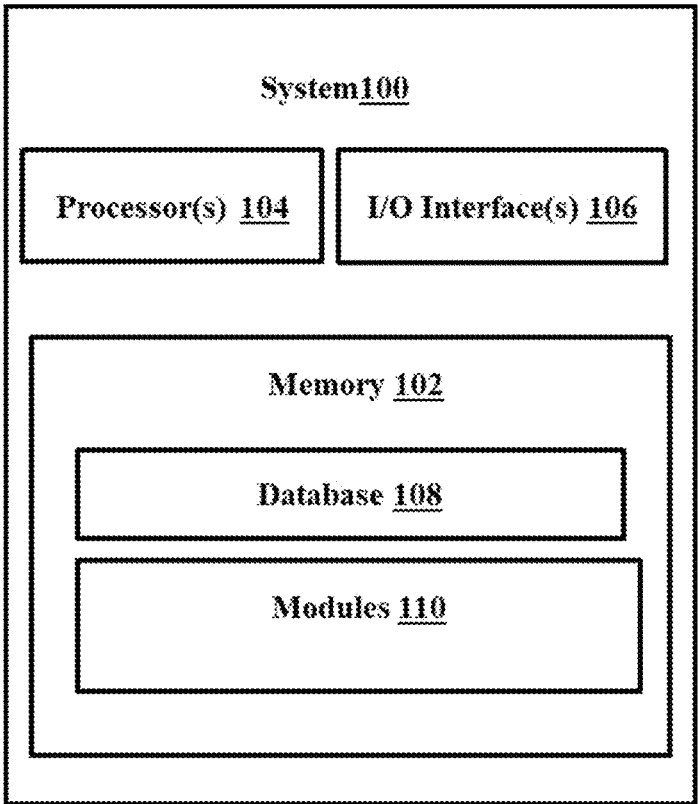
FIG. 1 is a functional block diagram of a system for dynamic value determination and performance based royalty calculation of non-fungible Tokens (NFTs) created for the agricultural assets, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Agriculture is one of the key sectors in India and across the globe. Agricultural lands (Agri-lands), also referred to as farmlands or croplands, are traditionally owned by small groups of families, and it is passed on to the next generations. This is applicable across many parts of the world. Over the recent years, contract farming has been adopted by many corporates/organizations and are working with farmers. In such cases, contract farmers are getting the land on lease or rent or buying it from the farmers. However, selling or buying, leasing, or renting of the agricultural land and associated products (farm produce, farm by products such as farm diary, farm art, etc.) have certain challenges. Farm diary is the physical and/or digital recording of the farm management sequence of unique practices which are followed by the farmers which helps him to achieve the sustainable production (that is reduction or removal of greenhouse gas emissions such as carbon or methane and the higher and superior quality of yield). Similarly, farm art refers to aesthetic view, or positions of various things in the surrounding that enhance the look and feel of the farm. This also includes landscaping.

Across many parts of the world, records of the ownership of Agri-land and associated metadata are being maintained in the physical registers and involve lots of paperwork. This may result in significant time delays in processing, introduces challenges of verifying land ownership and creates chances of fraud as the individual involved in such transactions can be manipulated.

While their digital entries are being created, Agri-lands are being digitized to maintain digital records, all of that is recorded and controlled from the centralized database maintained by relevant departmental agencies. Hence, even though digital records are being created, there are chances of manipulation, fraud, or security risks.

Agricultural land is not merely a piece of land having an associated economical value, but its generative capacity depends on multiple factors of human, animal, ecological and environmental events. Quality and quantity of agricultural produce is another important metric in understanding the value of the agricultural land. Some by-products like farm art, or biodiversity on the land can also positively influence the valuation. But such factors are rarely considered during the valuation and/or may follow an ad-hoc process based on the individual judgement due to absence of a streamlined, standardized global guideline, method, or system.

Valuations tend to be biased by the physical observations at the time of the observations made by the human valuator, their personal mindset at that moment, the expertise and relevancy of skills of valuation, ethical or emotional factors, etc. that may affect the decision making ability and hence can lack the continuous time-series based events which would have led to the instantaneous observation. Hence, it will be limited to only one or few instant or discrete data and may lack the complete or true picture of the observed entity or the agriculture product or by-products or entities.

Some of the agricultural products or by products may be time sensitive or as available for only a season or part of the season such as particular types of flowers like Tulip or a farm art based on the crop and inter-crop growth, or depending on the short term weather effects such as rain, flash flood, hailstorm, snowfall, or emergence of particular natural insects or pests like butterflies etc. Hence, valuation must also be in sync with the biological lifecycle of such products or assets.

Some of the valuation related observations to be made may be affected due to inaccessible regions like forests or in places such as below the ground or at a distance or at height from the ground. Inaccessibility or reduced accessibility to such regions may also invite local, but untrained or inexperienced valuators to attempt valuations. Hence, in such cases, physical observations and valuations are difficult or unfair.

Valuation is a skilled job and requires expertise, but due to the absence of a structured, standardized, and globally recognized certified valuation process or body of knowledge or professionals especially in the agriculture sector and emerging newer opportunities like NFT and types of agricultural products or by-products such as farm arts, an all-comprehensive methodology is required.

Many progressive farmers have developed unique methods of cultivating the crops, by creating or adopting farm practices and decisions with their or other experiences, which are helping them generate better and sustainable produce. On observing benefits, such practices are also adapted by other farmers in the same or other similar geographical regions to improve their productivity. But the farmer/entity who have developed that farm diary are not getting enough due as there is no tracking about the ownership, or a maintained record or recognition of knowledge they generated, in a transparent manner.

Similar to other art/pictures, farm arts could be generated dynamically depending upon the location/surrounding and actual farming operations being carried out which could be additional source of income for the farmers. However, there is issues with reliable ownership, how/who will generate the same, transaction platform etc. and hence farmers are not encouraged to do that.

There is no defined or standardized method for valuation of the Agri-land and currently, only its location plays the key role. This creates a bias in pricing of the Agri-land for transactions, such as selling/buying, leasing/renting etc.

Existing approaches do not consider what has been historically grown over the Agri-land, how it has been grown, how the followed farm operations and practices affected the quality of soil and produce over the years, which pests interfered in the cultivation cycles, how the type and quantity of agricultural inputs affected the Agri-land, how much carbon was sequestered in the Agri-land, etc. There are some of the many significant dynamism factors when Agri-lands are cultivating the crops. So, there is a need to consider these dynamic parameters to come up with a precise and fair valuation of the Agri-land, along with the static parameters, like location of the Agri-land.

There is no rewarding mechanism for the use of ingenious/inventive/innovative/experiential/intuitive practices, techniques, inputs, etc. that a farmer can claim or get financially benefited from.

Since these assets such as agricultural land or its produce or by products may change multiple hands over a given period, it is very difficult to record, track and trace the actions taken by each one, and its positive and negative consequences towards the value addition of the said asset(s).

Also, there is no existing mechanism to cover the risks associated with the loss of such assets as agricultural produce non-fungible tokens (NFTs) or farm art NFTs. A globally recognized, standardized valuation method and system will help the insurance companies to offer such constructive and comprehensive insurance products.

Absence of such valuation methods and system is also a challenge for local, regional and/or federal governments/administrations to regulate and appropriately tax the economic transactions emerging out of such transactions.

Due to the nature of the produce or by-products associated with the given agricultural land or asset, and cumulative effect of various actions taken by the previous or current owners on the land, the types, quality and quantity of benefits accrued or generated on two farms similar to each other in physical aspects, next to each other or in same region, can still be different and hence may fetch different economical values or get appropriate compensation in case the land is impacted due to natural or human made calamities such as flood, drought, fire, animal rampage, etc. or if the lands are being acquired by the government for any infrastructural development.

All these problems affect the Agri-land owners/farmers from getting their Agri-land, produce or assets to be fairly and aptly valued, given the above scenarios, for buy-sell, mortgage, lease, etc.

Embodiments of the present invention provide a method and system for dynamic value determination and performance based royalty calculation of non-fungible Tokens (NFTs) created for the agricultural assets. The NFT creation of various Assets/Products generated from an agricultural land, including the agricultural land allows for reliable and authentic ownership tracking and the removal of frauds/biases affecting the valuation of the said asset(s), as all the transactions are recorded and visible to everybody on the platform. Creation of more such NFTs allow for generation of additional income sources to the farmers.

This method and system enables the dynamic valuation of NFT's generated above. Various biases, such as location (or spatial), temporal or human judgment-based biases in the existing valuation systems are removed by having dynamic and performance-based valuation approach proposed in this invention. The method disclosed enables performance or creation-based (creation of Intellectual Property, Knowledge base, Geographical Indication) royalties/rewards for the NFT owner or entities involved in the process.

Hardly any attempts have been seen towards providing reward or royalty to the Agri-land owner/farmer based on their creation or sustainable performance in the agricultural sector.

Since NFT's have the uniqueness that they cannot be exchanged with other tokens, they can be used as a means of safely guaranteeing the uniqueness of specific assets/products generated from a specific Agri-land. The system and method disclosed enables creation of Non-Fungible Tokens (NFT) for various agricultural land and associated assets, such as land itself, agricultural produce and by-products, farm diary, visual arts i.e., Farm-As-An-Art, (for full or part of the farm, visible at ground level or at a height). The major agricultural assets considered for explanation are as defined below. However, they are not limited to only these as the proposed method and system can be extended to cover different types of farm assets.

Agricultural land (Agri-land or Cropland or Farmland or Land): This is the parcel of the land which can be used for different types of vegetation such as crops, plantations, orchard, forestry, or rearing livestock, farm pond for fisheries or aquaculture or any kind of food-fodder-fuel, environmental activities, or eco-tourism. It is the cultivable properties or characteristics of the land which is important thought it might have not been cultivated actively in the current time or may be in the past or in the future.

Agriculture produce or Farm produce or By-Products: These refer to outputs generated from the agricultural land, such as grass, seedlings, plants, flowers, fruits, or other associated bio-diversity elements. Besides these the unseen elements that are important, such as sequestrated carbon or fixed nitrogen, or any other greenhouse gases (GHG) either emitted or absorbed during the production, and/or pre- and post-production phases, as well as the changes in the soil properties, such enrichment of the soil major or macro nutrient and/or surrounding ecosystem.

Farm Diary: This is a journaling mechanism either in any form of physical, such as paper, leaf, or material, digital or hybrid format. This captures all sorts of the farm operations carried out from the pre-sowing or pre-animal insemination or pre-emergence state to that of the production and post-production treatment of any sort of agriculture (i.e. farming, forestry, diary, livestock and aquaculture or fisheries management, or eco-tourism) activities. This is also the compilation of the various events which occurred or were observed in the agricultural land ecosystem, or which influenced the land anyway, across various present and historical cultivation cycles. This Farm Diary is very important to reach a conclusion of the process which would have led to the increase or dip in the potential quantity and quality of the agricultural land output. Hence, it's a very important physical or digital journal from the valuation perspective.

Farm-As-An-Art or Farm art: This is an emerging form of art where the aesthetic feel of the farm either its layout or the farm produce in different stages give an impression of creative form of expression. Tulip gardens are the floricultural form of agriculture in which the production of the different colors and shades of the Tulip flowers are arranged in a way that the aesthetic value of the flower farm increases and attracts the tourists across the globe. Similar to these, there could be different types of farm arts growing intercropping of different colors so that the consolidated effect when seen from the top or side could be that of a flag of a country, or caricature or portrait of a famous personality or could be a theme or even different types of messaging such as of famous film, media, and entertainment studios. It also encompasses a modern generative adversarial network (GAN) algorithm based system that takes inputs from various phy-gital (physical/digital) static and dynamic parameters of the Agri-land, as well as farm diary for the current or previous cultivation cycle and generates a set of images that it has "imagined" (artificial imagination), as an output. Such GAN models can be pre-trained and pre-tuned to generate imaging of a farm ambience setting. Such Digital Farm Art can hold uniqueness and a lot of value in the art industry, and draw interest of a niche set of enthusiasts, and can open new avenues of revenue generation for the farmer/Agri-land owner. It is also captured as an NFT. Selling and reselling of such Digital Farm Art attracts an incremental and passive, but substantial source of income, from the art enthusiasts. Besides the above agricultural assets, there can be other agricultural asset class or assets physical, digital, or augmented-, virtual- or in general, extended reality-based, which can be added to this flexible method and system giving an easy extension.

The method enables automating Agri-asset valuation to obtain a true valuation by capturing and quantifying agricultural assets or products related attributes that covers geographical, economical, and sustainable farming attributes, wherein significance of each attribute can be dynamically configured based on the type of the asset.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of a system 100 for dynamic value determination and performance based royalty calculation of non-fungible Tokens (NFTs) created for the agricultural assets, in accordance with some embodiments of the present disclosure.

Figure 2:
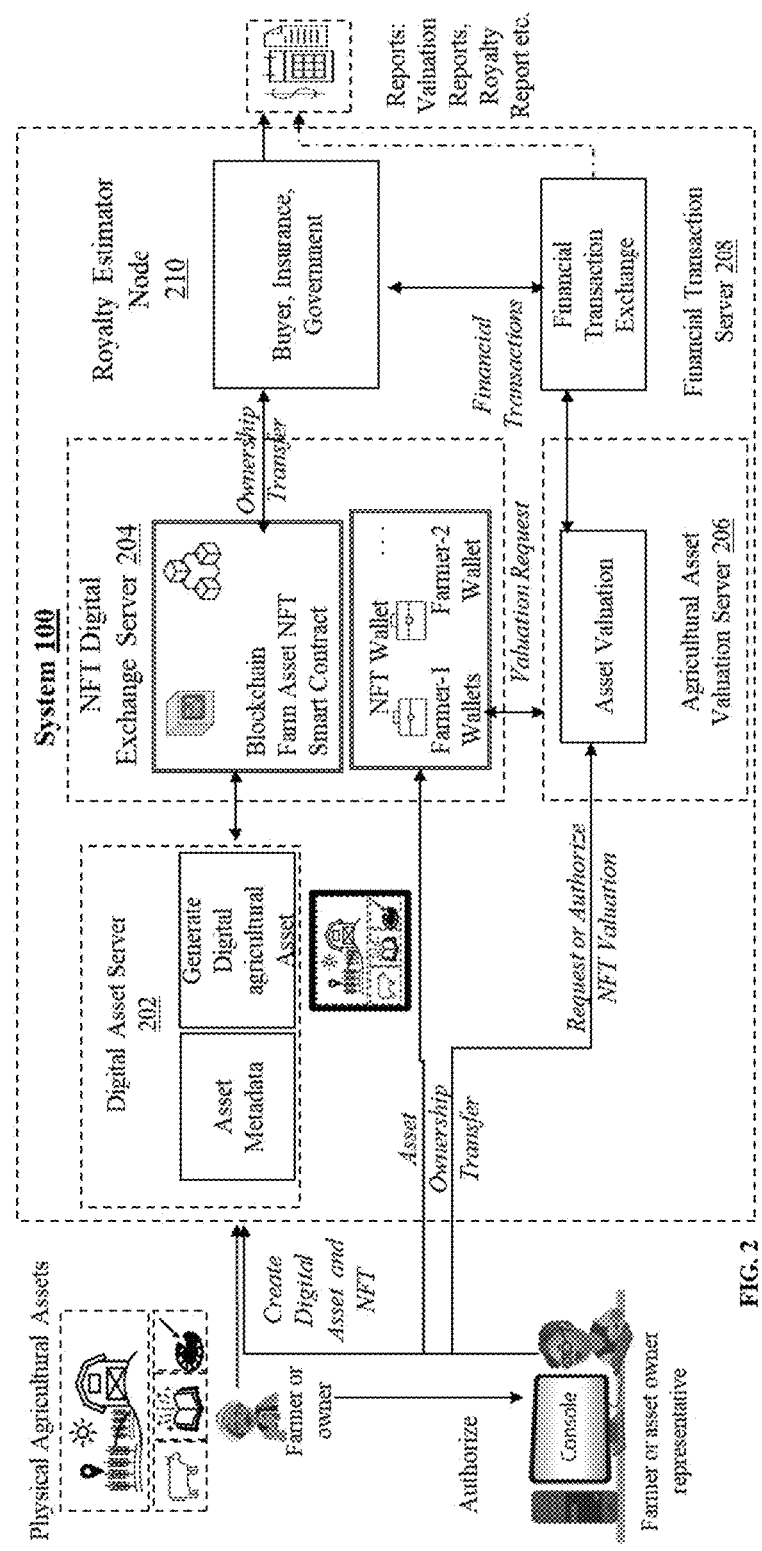
FIG. 2 illustrates an architectural overview of the system of FIG. 1, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. As depicted in FIG. 2, the overall architecture of the system 100 comprises components such as a digital asset server 202 receiving an agriculture or farm asset also referred to as physical farm asset to be digitized and recorded, a NFT digital exchange server 204, an agricultural asset valuation server 206, a financial transaction server 208 and a Buyer, Insurance, Government, Royalty Estimator Node 210, which communicate with each other through the I/O interfaces 106. As well understood for person skilled in the art, the components of the system may be physically distributed within the environment of system 100 and can be implemented in cloud servers of a cloud environment.

The system 100, with one or more hardware processors present across the physically distributed components, is configured to execute functions of one or more functional blocks or components (servers) of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, including, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices. As depicted in the architecture of system 100 of FIG. 2, the external devices can include a plurality of sensors (which includes satellite sensors, flying or moving sensor, on-field sensors, plant or crop sensors, humans acting as sensors), Global Positioning System (GPS) enabled mobile devices with sensing, processing, communicating, displaying and storage capability, external third party data sources for various types of field level information associated with croplands or farmlands of the plurality of farmers, external sources for sourcing weather, soil, water and irrigation sources, farm equipment and mechanization, farm operation material and relevant information, market price, regional or national level asset price or rate card, regional crop knowledge crop and parts like pest images, drone, rover images, and satellite data.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 distributed across each of the distributed components (servers). The plurality of modules 110 include programs or coded instructions that supplement applications or functions performed by the components of system 100 for executing different steps involved in the process of estimating valuation and performance based royalty of non-fungible Tokens (NFTs) created for the agricultural assets, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108, which can be a distributed storage for each of the components such as servers depicted in FIG. 2. The database (or repository) 108 may include a plurality of abstracted pieces of code for refinement and data that is processed, received, or generated as a result of the execution of the plurality of modules in the module(s) 110. The database stores information pertaining to the physical farm assets or physical agricultural assets of a plurality of farmers registered with the system 100, associated farm asset metadata of the physical farm assets, digital data of the physical farm assets, NFTs created for the physical farm assets and associated metadata block of the NFTs, and the like.

Further, the NFT Wallet and Exchange Server 206 within the system 100 includes the blockchain network having the smart contracts and a distributed ledger recording the transaction of assets (herein NFTs).

Although the database 108 is shown internal to the system 100, it will be noted that, in alternate embodiments, the database 108 can also be implemented external to the system 100, and communicatively coupled to the system 100. The data contained within such an external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS) or any non-relational database such as NoSQL or document databases. Functions of the components of the system 100 are now explained with reference to architecture as depicted in FIG. 2 and steps in flow diagrams in FIG. 3A through FIG. 3B.

FIG. 2 illustrates an architectural overview of the system 100 of FIG. 1, in accordance with some embodiments of the present disclosure. The system 100 comprises components such as the digital asset server 202 receiving the farm asset also referred to as physical farm asset or physical agricultural asset to be digitized and recorded, the NFT digital exchange server 204 having NFT wallet creating a digital asset for the digitized agricultural asset, the agricultural asset valuation server 206, the financial transaction server 208 and the Royalty Estimator Node 210, which communicate with each other through respective I/O interfaces 106.

It can be noted that the architectural overview and system functionality for creating NFTs through blockchain network and determining their value is similar to architecture disclosed by the Applicant in Applicant's Indian patent application No: 202321037342 filed on 30 May 2023 titled 'ESTIMATING FLEXIBLE CREDIT ELIGIBILITY AND DISBURSEMENT SCHEDULE USING NON-FUNGIBLE TOKENS (NFTs) OF AGRICULTURAL ASSETS'. Thus some functionality explanation of the system may be explained briefly and can be further understood from the Applicant's above application. However, it can be noted that the above patent application does not capture farm diary and farm art as NFT's, and the NFT valuation computation is limited to perspective of loan collateral valuation. The system disclosed herein additional generates NFTs for farm art and farm diary and provides computation for their valuation. Furthermore, the system 100 disclosed herein provides performance based royalty computation.

The system 100 includes:
   a. Acquiring Meta Data for each type or class of the agricultural asset or product
   b. Developing a Digital asset, a form of that physical agricultural asset or product using the meta data
   c. Generating NFT for each Digital Asset by creating a smart contract in a blockchain based distributed ledger network. This network is also used for the transfer of the NFTs as well as recording the destruction of the NFTs too. It manages the entire life cycle of the NFTs.

NFTs can be full or partial and they can be accordingly linked, transferred, or traded in partial or full, from one owner to other. The Smart contract has the details of the current owner, as well as the previous owners and associated their value addition to each asset or product and accordingly the royalty or reward percentage calculated for them in the proportion to the value addition.

A reference knowledge, and valuation database which helps in deciding the current value of the NFT as per the laid down principles of calculation, at the time of the calculation. This reference knowledge and valuation value (in respective currency) would change as per the market demand and other factors of each asset class.

Financial transaction server 208 where the equivalent monetary transactions are recorded, and which can be linked or extended to regional, or government regulated monetary exchanges.

As depicted, the system 100 includes generation of NFTs for agricultural assets associated with each farmland owned by a current owner, farmer. The farmer him/her are with help of farmer representative can register his. Her farm assets for generation of NFTs. The NFT generation is performed by the digital asset server 202. The NFT types include NFT created for different types of Agri-assets such as Agri-Land, Farm-Diary, Crop-produce, Farm-art, etc.

NFTs are created for all the agricultural assets associated with corresponding farmland by the NFT Digital Exchange Server 204 in a distributed ledger-based blockchain network where smart contract for each NFT includes the metadata and other details associated with the terms of usage, thresholds, if any, conditions, etc. These NFTs are allocated to a virtual Farmer Wallet (individual farmer accounts) post creation for the easy grouping and group-based transactions.

Further, the system 100 disclosed herein provides a standardized or structured and comprehensive approach for dynamic valuation of NFTs, wherein dynamic valuation of the NFTs is performed by the agricultural asset valuation server 206, considering geophysical, economical and sustainability attributes associated with each NFTs. For dynamic valuation of the NFTs, weighted sum of geophysical, economical, and sustainability attributes is taken.

In addition to this, these NFTs can be rewarded with royalty for their creation or ownership based on certain performance criteria. Herein, disclosed system and method for estimation of royalties or rewards to the NFT owners. The system 100 also enables deciding the rightful beneficiary (current or previous owner(s)) who will receive this royalty every time the NFT is purchased/sold. Performance based royalties are proposed in the case of NFTs such as Agri-land, farm-diary whereas creation-based royalties are provided for NFTs such as farm-art.

The various components of system 100 include generative adversarial network (GAN) algorithm to generate Digital Farm Art based on pre-seeded training dataset The blockchain network enables mechanism to create the NFTs of various assets/products. The blockchain-based distributed ledger carries out and maintains NFT-related transactions. The distributed databases (database 108) store and handle smart contracts.

In addition to the above components the system 100 is supported with external data gathering sources such as hand-held device or mobile phone with sensing, processing, communicating and storage capability, time series remote sensing data (Optical as well as SAR data), Coarse and high-resolution satellite data sourced from external sources. Further via external sources and systems fata such as geo-tagged plots and associated crop type (for current and historical period) is gathered. Field level weather observations, like air temperature, rainfall, land surface temperature, etc. are sourced from automatic weather stations, satellites, and on-field sensors.

Global Positioning System (GPS) enabled mobile phones to communicate with the system enable capturing images, reporting incidents, interface for farmer queries, etc. along with a few geo-tagged points to form the field boundaries of the selected fields. Mobile crowd-sourcing application or program running on a mobile phone or similar portable handheld device. Additionally the system 100 includes servers to process events, messages, requests and send responses, to execute an algorithm for agricultural credit eligibility, automatic credit disbursement schedule. The servers also compute/Hardware to process the satellite, weather, on-field sensors data and store the relevant raw, processed data, outputs.

FIGS. 3A through 3B (collectively referred as FIG. 3) is a flow diagram illustrating a method 300 for dynamic value determination and performance based royalty calculation of non-fungible Tokens (NFTs) created for the agricultural assets, using the system depicted in FIGS. 1 and 2, in accordance with some embodiments of the present disclosure. The method 300 is further understood with the help of the case study provided later.

In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIGS. 1 and 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

With reference architecture of the system 100 depicted in FIG. 2 and referring to the steps of the method 300, at step 302 of the method 300, the one or more hardware processors 104 of the agricultural asset valuation server 206 are configured by the instruction to receive a request for at least one of a) valuation of a Non-Fungible Token (NFT) created for an agricultural asset from among a plurality of NFTs created for a plurality of agricultural assets owned by a current owner, and b) computing a royalty to be received by the current owner and one or more previous owners of the NFT. The plurality of NFTs belong to a plurality of NFT types, and wherein the NFT is tagged as a royalty generating NFT if one or more activities associated with the agricultural asset associated with the NFT are non-consumable nature.

The NFT creation is explained below: The digital asset server 202 is configured by the instruction to validate and create a plurality of digital farm assets for a plurality of physical farm assets registered by a farmer or a farmer representative. The plurality of physical agricultural assets comprises at least one agricultural land, agriculture produce or by-products, farm diary and farm-as-an-art. The plurality of digital farm assets are then recorded into blockchain network by creating corresponding plurality of NFTs by the NFT Digital Exchange Server 204. These physical farm assets are registered by a farmer or a farmer representative into the digital asset server 202 and may be text, encrypted data, binary data or images and video in digital form, paper documents later scanned into the system 100. The farmer representative herein refers to an authorized agent for the farmer, in capacity to communicate with the system 100 for registering digital farm asset or communicating with the system 100 for actions associated with the NFTed assets corresponding to the digital farm assets. Prior to registering the physical farm assets provided by the farmer, the digital asset server 202 performs a validation check to ensure if a physical farm asset exists, can be NFTed, and only then proceeds with registration. This will include checking the list of the assets recognized by potential buyers, insurance or lending institutions, and regional government or regulators as assets which is of the significant economic value. This can include entities which are owned by the farmer with clear government recognized proof of ownership, and each entity having certain utility and monetary value such as, but not limited to, Agri land, farm produce or trees or plants, digital assets, etc. and all other asset classes mentioned elsewhere in the document. Each entity is compared with the master list available with the NFT Digital Exchange Server 204 as published by the government entities and leading agricultural sector institutions which are members of blockchain network NFT Digital Exchange server 204. Based on the associated asset list criteria and the detailed guidelines, the asset is registered as NFT or rejected. The process is iteratively repeated for all the assets provided by the farmer or farmer representative for this purpose. The system 100 ensures that the plurality of farm assets or products comprises at least one Agri-land and other asset classes as mentioned above, when plurality of farmers approach to register the physical farm assets owned by them. It can be well understood that Agri-land is the main asset of interest for any financial entity, hence this check performed by the digital asset server 202 is critical. The non-Agri-land agricultural assets are additional valuation. For example, farm produce proof, farm diary and other documents obtained by the farmer from standard sectoral authorities of the corresponding region can be one of the verification source for these assets.

The digital asset server 202: Generates or creates the unique digital form of various physical farm assets into digital farm assets later represented by NFTs into a farmer wallet of the NFT Digital Exchange Server 204. A NFT wallet in the NFT Digital Exchange Server 204 maintains a plurality of farm wallets for recording NFTs created for agricultural assets, also referred to as physical farm assets of a plurality of farmers. As can be seen in FIG. 2, a farm wallet is created for each farmer. The digital farm assets can be generated by various techniques to gather and record information associated with each physical farm asset. It can be a combination of one or more information such as digital spatial view or photo of the farm taken at a certain vertical height from a flying object such as balloon, drone, airplane, or satellite, along with geocoordinate and/or unique farm identifier given by regional or federal government authority. It can be the digital receipt of the farm produce post the harvesting duly signed by the weighing machine agency or the environmental report of the assessment done for the farm for its by product or the biodiversity. It could be the scanned copy of the farm diary. or the farm art photo taken through a digital medium, preferably taken from different angle and its history, optionally validated and physically, or digitally signed by the information collecting agent or appropriate officer or authority. It can be the photographs and geocoordinate of the immoveable objects like water bodies such as well or borewell piece of content that the NFT represents with date and time stamp up to seconds value. It can also capture the proof of ownership in physical and/or digital format. These can be either static in nature or can be an interactive piece which can respond to user input. The information associated with a physical farm asset, that is provided by the farmer is not restricted to digital images or scanned document but can also be provided an interface to enable overlay of information over digitized information of submitted asset related information. This enhances the end user experience at farmer end. This asset or assets can be registered as offerings under the specific asset, instrumentation and/or securities Acts of a country, allowing them for a transaction. Hence, the sellers (or entity transferring the ownership) of NFTs are liable to provide complete information which should not be materially misleading, and hence they are liable to purchasers or mortgaging agency under various federal Rules and laws, and may be criminally penalize for violations, if any.

The digital asset server 202 is configured by the instruction to source and record a farm or agricultural asset metadata associated with each of the physical farm or agricultural assets, wherein the agricultural asset metadata is used by the NFT Digital exchange server 204 during creation of a plurality of Non-Fungible Tokens (NFTs) associated with the plurality of digital farm assets. The plurality of NFTs represent collaterals available with the farmer.

The agricultural asset metadata also captures specific attribute information of individual farm assets, for example, Agri-land can have geotagged field boundary, government land identification no., date of creation of records and/or ownership of the asset, etc. It will also have the physical world unique identity of the assets, to achieve a coherence between the two world—physical and digital.

For the assets with definite expiry date such as farm produce or any other by-products, farm asset metadata also includes a system calculated "asset inactive or expiry date" which is based on domain or expert knowledge in the sector, such as maximum utility period or any regional or governmental guidelines or rules. Post this asset inactive date, or any other date earlier to this, when the said asset has ceased to exist such as death in case of livestock or destruction in case of equipment, the digital assets server 202 in the system 100, marks the farm asset as expired and associated NFTs are debited from farmer wallet within the NFT wallet block. The system 100 ensures these expired NFTs are not traded any more. However, all historical information can still be retrieved from the system 100, as and when needed.

At step 304, of the method 300, the one or more hardware processors 104 of the agricultural asset valuation server 206 are configured by the instructions to dynamically generate an attribute tuple (G, E, S) for the NFT. The attribute tuple comprising a geographical attribute (G), an economical attribute (E), and a sustainability attribute recorded for the agricultural asset associated with the NFT. Each of the geographical attribute, the economical attribute and the sustainability attribute comprises a plurality of parameters.

At step 306, of the method 300, the one or more hardware processors 104 of the agricultural asset valuation server 206 are configured by the instructions to assigning an individual score to each parameter available within the geographical attribute, the economical attribute, and the sustainability attribute based on relevancy of an attribute to a NFT type of the NFT.

The steps 306 to 312 can be better understood with the help of a case study of a farmland explained later below.

At step 308, of the method 300, the one or more hardware processors 104 of the agricultural asset valuation server 206 are configured by the instructions to integrate the individual scores for each parameter within the geographical attribute, the economical attribute, and the sustainability attribute to generate an overall score associated with each element of the attribute tuple (G, E, S).

At step 310, of the method 300, the one or more hardware processors 104 of the agricultural asset valuation server 206 are configured by the instructions to assigning a weightage to each element of the attribute tuple based on a NFT type of the NFT from among the plurality of NFT types and significance of each element of the attribute tuple for the NFT type and the cropland with which the NFT is associated. The significance is broadly distributed across the attributes as mentioned below, and actual weight values are provided in the Case study later.

1) If the type of NFT is a cropland, each element (G, E, S) of the attribute tuple is provided equal significance and the assigned weightage is equally distributed among each element (G, E, S) of the attribute tuple.

2) If the type of NFT is a farm produce, element E has highest significance followed by element S and element G of the attribute tuple and assigned weightage decreases from E, S to G elements of the attribute tuple.

3) If the type of NFT is a farm diary, element G and element S of the attribute tuple are provided higher significance as compared to element E and assigned weightage decreases from S, G to E elements of the attribute tuple.

4) If the type of NFT is a farm art, element G is provided highest significance as compared to element E and element S, and assigned weightage is highest to G element and equal to the S and E elements of the attribute tuple.

The steps 304 to 310 are further elaborated below for better understanding.

Dynamic valuation of NFTs generated from the agricultural land: Various raw data-sources such as remote sensing satellite images, data from on-field sensors about various farming activities, data obtained from the farmers via crowdsourcing, openly available data about regional yields, locational attributes such as geotagged field boundary, availability of resources, distance to market, roads, sustainable practices followed by the farmers etc. In addition to this various outputs (generated using the one or more combination of raw data sources) such derived outputs in terms of yield, quality, sustainability score/index.

Dynamic valuation of NFTs is carried out based on three parameters such as a) geographical attributes, b) economical attributes and c) sustainability attributes of the generated NFTs. Each attribute is provided an associated weight depending on the type of NFT and valuation is carried out based on the weighted sum of geophysical, economical and sustainability attributes.

Geographical attributes, interchangeably referred as geophysical attributes/properties of the NFT, include parameters, but not limited to, location of the agricultural field, agro-ecological and agro-climatic zone, soil, elevation, distance to market, availability of natural resources (water, soil), availability to infrastructure (access to market/APMC, motorable road/highway, storage houses), aesthetic features available in the surrounding (such as rives, ponds, well, mountains, roads/highways etc.).

Economical attributes parameters include but are not limited to the quantity (yields in kg/ha), quality (grade), market prices during the harvest of the produce, monetary benefits achieved from the land by selling of specific NFT, % increase in the yield Sustainability attributes parameters include but are not limited to sustainable practices followed over the land, soil health, reduction, or removal of GHGs, optimal use of natural resources etc., quality of the produce generated.

$$NFT(\text{valuation}) = f(\text{type of } NFT, \tag{1}$$

$$\text{Geophysical importance, Economical Value, Sustainability Score})$$

The geophysical importance of NFT is calculated based on the type of NFT and the one or more geophysical attributed mentioned above. The Economical Value of the NFT is calculated based on the NFT and economical attributes mentioned above. Sustainability score is calculated based on NFT and relevant sustainability attributes mentioned above.

$$NFT(\text{valuation}) = (w1 * \text{Geophysical importance}) + \tag{2}$$

$$(w2 * \text{Economical Value}) + (w3 * \text{Sustainability score})$$

Specific valuation of NFTs generated from the Agri-land are as follows

NFT of the Agri-land: Valuation of NFT of Agri-land is based on three parameters such as geophysical market value of the land, economical value of produce generated from the land and sustainability score. Geophysical market value is estimated based on the parameters (G1, G2 . . . ) such as but not limited to exact location of the land, availability of natural resources in the region such as water, soil texture/fertility, availability of resources and infrastructure such as availability of labor, roads, distance to market etc. The economic value of the agricultural produce is estimated based on the parameters (E1, E2 . . . ) such as but not limited to quantity (yields in kg/ha), quality (grade) and market prices during the harvest of the produce. Sustainability attribute indicates how well the practices have been followed over the Agri-land to minimize and reduce the GHGs. Finally the value of the Agri-land is calculated by weighted sum of geophysical, economical and sustainability attributes. The method ensures that all the static and dynamic components are considered for valuation. All the parameters are equally important (equal significance) to get the fair valuation of the Agri-land hence equal weightages will be assigned to all the three attributes.

NFT of the Farm-diary: Method for valuation of NFT of the farm diary includes the geophysical parameters such as agro-climatic and agro-ecological zone for which the farm-diary is applicable, crop and variety for which the farm-diary has been generated, soil, season etc. Economical attribute parameters such as but not limited to average regional yields obtained by following regular/traditional practices, and spatial-temporal yield pattern in the region, yields and monetary benefits obtained by following farm-diary, quality of the produce generated using the NFTed farm-diary etc. Sustainability attributes includes the type of sustainable practices followed in the farm-diary, reductions or removals of GHG from the farm. Higher weightage is given sustainability score followed by economical value and geophysical importance.

This ensures that Intellectual Property (IP) of the farmer (one who generated that farm-diary) is protected by creating the NFT of the farm diary and NFT owner can sell and/or lease the full or part of NFT (farm-diary) and can generate revenue out of it.

NFT of the Farm-Produce: Method for dynamic valuation of NFT of the produce generated from agricultural land considers the geophysical parameters such as distance to market, economical attributes such as quantity (yields in kg/ha), quality (grade) and market prices during the harvest of the produce, and sustainability attributes such as use of the Agri-inputs such as fertilizers, pesticides, water etc. Here more weightages will be given to economical attributes followed by sustainability and geophysical attributes.

Creation of NFT of Agri-produce ensures transparency and tracking of the produce which builds the trust among end-consumers and NFTed produce will help NFT owner to get better prices than traditional ways.

NFT of the farm-art: Method for dynamic valuation of NFT of the farm art is carried out considering the geophysical attributes such as geo-location and its surrounding in terms of river, mountains if any, crops grown, other assets farmer possess such as well, animals etc., and sustainability attributes such as practices followed on the agricultural land during the season. Maximum weightage will be given to the geophysical attributes.

At step 312 of the method 300, the one or more hardware processors 104 of the Agricultural Asset Valuation Server 206 are configured by the instructions to compute a valuation of the NFT as a weighted sum of the attribute tuple based on the integrated overall score of each element of the attribute tuple (G, E, S) weighed by the assigned weightage. The valuation so computed can then be used while performing NFT based trading by the financial transaction server 208. The royalty estimation node 210 generates valuation report and royalty reports for the received request Further, if the NFT is tagged as the royalty generating NFT then at step 302 the request to compute performance based royalty is processed, for the NFT. The royalty or reward is distributed between the current owner and the one or more previous owners.

1) If the type of the NFT is a cropland the royalty is provided to each of the current owner and the one or more owners based on an ownership period for the NFT, crops grown, yields obtained, soil health maintained during the ownership period, use of sustainable practices and a price for which the NFT has been bought.

2) If the type of the NFT is a farm diary the royalty is provided to the current owner based on percentage increase in gains from the agricultural asset associated with the NFT as a result of unique practices as compared to traditional practices of working with the agricultural asset.

3) If the type of the NFT is a farm art the royalty is provided statically to an owner of the NFT who is identified as creator of the farm art.

The method for providing reward/royalty for the transactions associated with the NFT. The method is applicable to NFTs which are non-consumable such as Agri-land, farm diary and farm art. The NFTed assets which can be consumed such as crop produce (farm produce) are ignored.

Reward/Royalty for the NFTed asset/product is decided dynamically based on the one or more attributes such as comparative performance, creation rights, ownership etc.

21

$$NFT(\text{royalty}) = f(\text{type of } NFT, \tag{3}$$

dynamic performance score, creation rights, ownership)

Royalty estimation mechanism of Agri-land: NFT associated with Agri-land can be owned by various owners during the life of the Agri-land, however traditional system of providing the royalty to the first owner does not make sense in this case. The method and system herein provides the dynamic and performance based reward/royalty mechanism to one or multiple NFT owners. For each NFT owner, depending on the period for which they own the NFT, crops grown, yields obtained, soil health, use of sustainable practices and the value of NFT at which they brought the same will be considered to estimate the royalty score for each NFT. Depending upon the scores royalties will be estimated and provided to the one or more NFT owners from the past.

Royalty estimation for NFT of Farm-Diary: Royalty for the NFT of the farm diary will be estimated dynamically based on the performance of the current NFT owner. The method considers parameters such as yield obtained, profits received, soil health and sustainability achieved etc., to estimate the % increase in the gains as compared to his traditional way of working and % increase in gains will be used for estimating the royalty amount.

Royalty estimation for NFT of Farm-Produce: In case of Farm-Art, royalty is decided by the creator, and this would be static in nature. For each NFT transaction, a certain sellable value will be given to NFT creator (first NFT owner) as a royalty.

Figure 4:
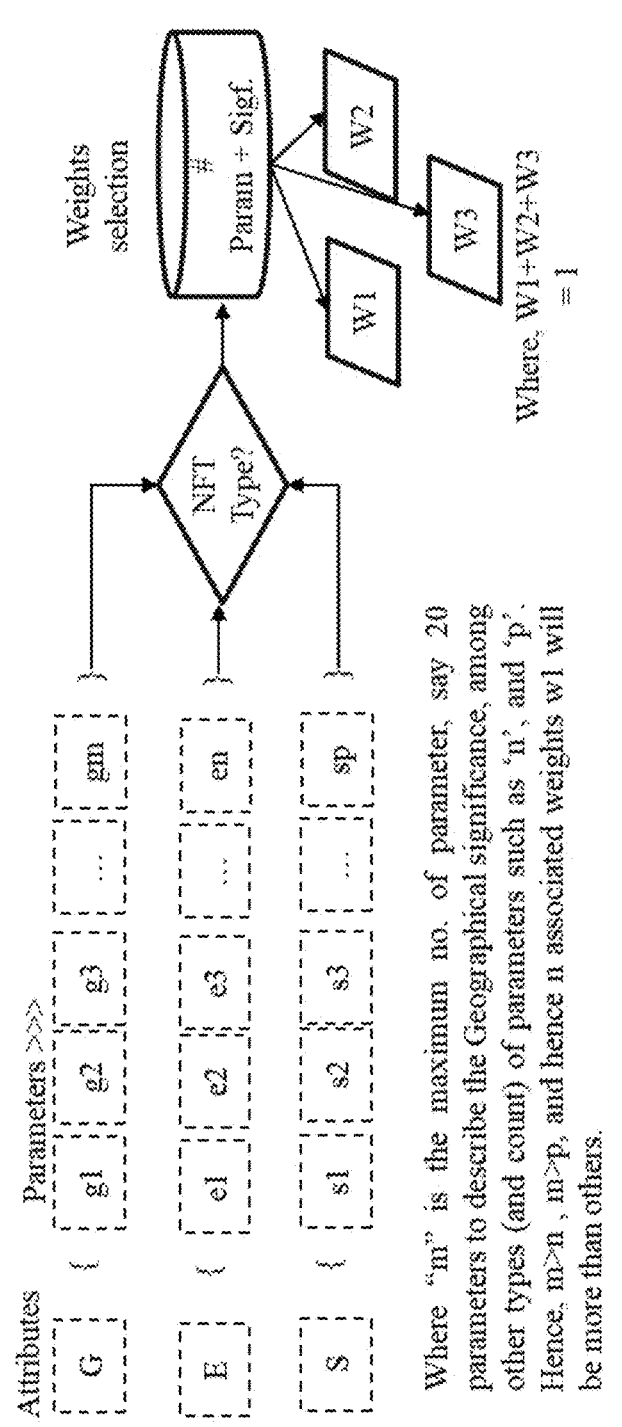
FIG. 4 is a schematic depicting the process of valuation of an NFT considering an attribute tuple, in accordance with some embodiments of the present disclosure.

FIG. 4 is a schematic explaining the NFT valuation process wherein G, E and S attributes are quantified using scoring for parameters of the attributes and integrated based on predefined weightages.

CASE STUDY: The entire method 300 and the system 100 is explained below with the help of a case study of a farmland. To understand the overall method better, consider four different agricultural fields or plots (F1, F2, F3, and F4) within the farmland under study. The farm is owned by a progressive farmer, who inherited F1 and F2 from his forefathers and acquired F3 and F4 from other peer farmers over last three decades. He is a progressive farmer, has experimented with different methods of farming to increase soil fertility, biodiversity and production from various farm plots and this improvisation and innovation is a continued process.

For each field, scores defined have a value ranging from 0 to 10, where 0 is the lowest score and 10 being the highest score across each category of attributes. Weights assigned to each attribute category will be a value between 0 to 1 and in such a way that the sum of weights for all the categories of the attributes will be 1.

Figure 5:
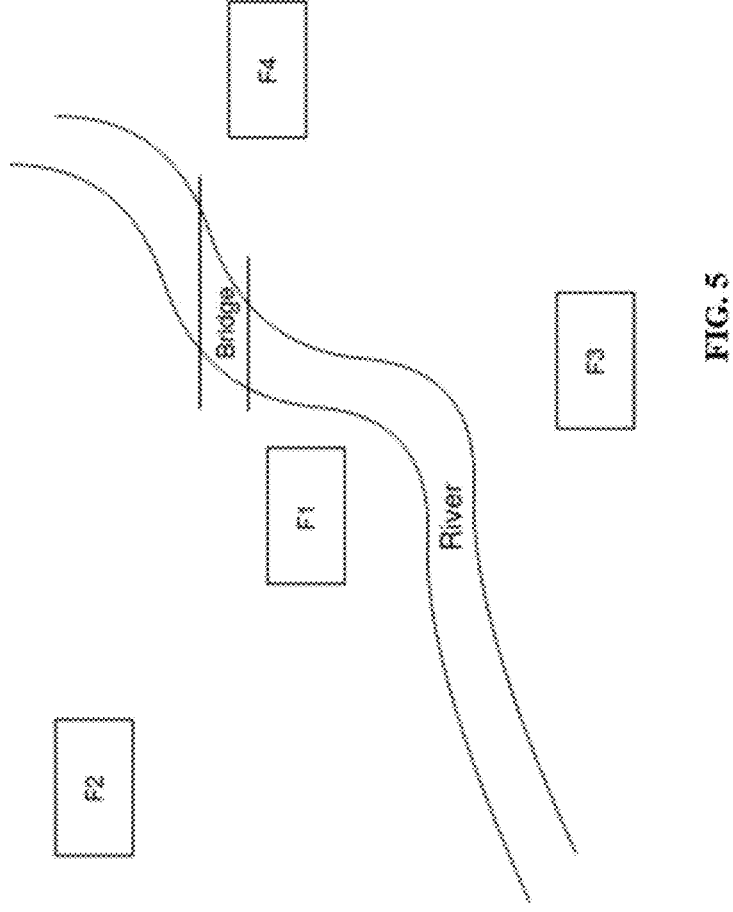
FIG. 5 is a schematic of a region with a multiple farmlands or croplands with significant geographical landmarks in the vicinity, in accordance with some embodiments of the present disclosure.

As depicted in FIG. 5, there is a river streaming through the farm, in a way that field F1 is geographically closer to this river and is also nearby to a state highway.

Figure 6:
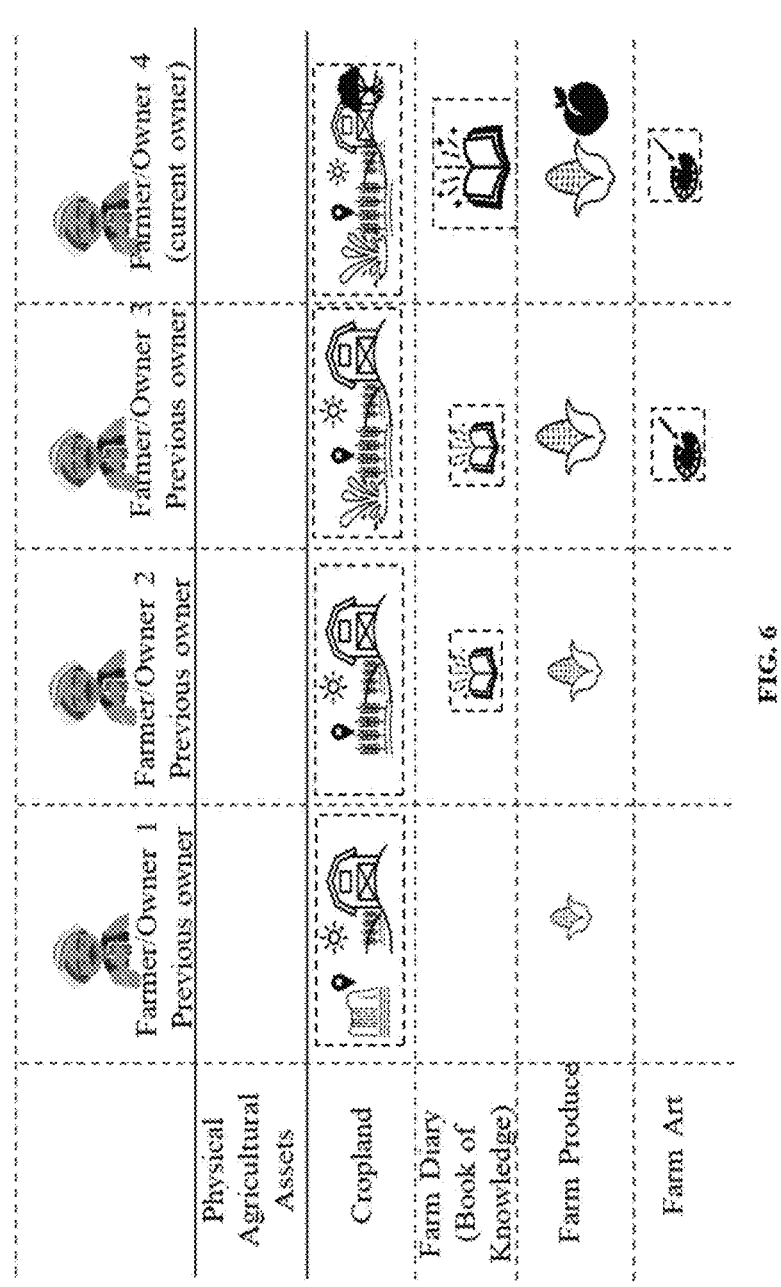
FIG. 6 schematic representation or process artifacts of changes associated with a farm land that are considered by the system during NFT valuation and performance based royalty computation for the NFT, in accordance with some embodiments of the present disclosure.

FIG. 6 example schematic representation or process artifacts of changes associated with a farm land (say F1) that are considered by the system during NFT valuation and performance based royalty computation for the NFT, in accordance with some embodiments of the present disclosure. The figure depicts how various developments or changes have occurred on the farm F1 with respect to each type of agricultural asset as the owners changed. The system 100 captures all these dynamics during valuation of the NFTs and royalty estimation.

The progressive farmer, henceforth interchangeably referred to as only farmer, is cultivating rice crop on this field F1 using a well-known environmental and soil friendly conservative farming technique, locally known as SRT technique. Rice yield and quality from F1 is of higher value. F1 during the flowering and maturity stage looks beautiful especially in the backdrop of the river and the highway. Conservative farming has led to earthworms and different types of birds feeding on them. Hence, F1 is a major attraction of Farmland.

Field F2 is a little far from the above-mentioned river and also from the state highway. Also, the farmer is cultivating rice crops using a traditional flooding-based approach. In this case the average yield obtained was high, however quality was not so good.

Field F3 is close to the river and nearby highway having mango plantations. Farmer has followed sustainable practices such as use of organic nutrient as well as use of the non-chemical pesticides. Yield and quality were quite high and due to compliance with stringent export quality standards, the produce is exported every year to Asia-Pacific (APAC) and European Union (EU) regions.

Field F4 is close to river and nearby highway but no crop has been cultivated on this for last five years and has been become barren land, hence it does not have any crop yield.

Weights (w1, w2 and w3)—Weights for individual attributes (components of the attribute tuple) such as G, E and S are varied based on the type of NFT. These weights are decided based on the number of parameters considered for each NFT across G, E and S. Weights are dynamically updated over time based on the number of parameters and subject matter expert. Weights will have value between 0 to 1 and addition of all weights will be 1

Scores—Scores for individual attributes such as G, E and S will be varied based on type of NFT and field over which that NFT is created/generated. These scores are also decided using a look-up table and SME based approach. This is explained in the table below. Cumulative score of all the parameters in each of G, E and S will be between 0 to 10.

Table 1A through Table 1C is each parameters of the attribute tuple (GES) that is being considered for Farm 1 (F1). Similarly, other farm fields will have similar tables indicating the presence or absence of certain parameters and corresponding values associated with those parameters.

TABLE 1A

|  | NFT type wise presence of one or more parameters of the attribute tuple (G, E, S) | | | | | | | | | | | |
| NFT | G1 | G2 | G3 | G4 | G5 | E1 | E2 | E3 | E4 | S1 | S2 | S3 | S4 |
| --- | --- | --- | --- | --- | --- | --- | --- | --- | --- | --- | --- | --- | --- |
| Cropland | Y | Y |  | Y |  | Y |  | Y |  | Y | Y |  | Y |
| Farm produce | Y |  | Y | Y | Y |  | Y | Y | Y | Y |  | Y |  |
| Farm diary | Y | Y | Y |  |  | Y | Y |  |  |  | Y |  | Y |
| Farm Art | Y |  | Y |  | Y |  | Y | Y | Y | Y |  | Y | Y |

TABLE 1B

| NFT | G1 | G2 | G3 | G4 | G5 | E1 | E2 | E3 | E4 | S1 | S2 | S3 | S4 |
| --- | --- | --- | --- | --- | --- | --- | --- | --- | --- | --- | --- | --- | --- |
| Cropland | 4 | 2 |  | 1 |  | 4 |  | 4 |  | 3 | 3 |  | 3.5 |
| Farm produce | 3 |  | 1.5 | 1.5 | 2 |  | 2.5 | 2 | 1.5 | 4 |  | 4.5 |  |
| Farm diary | 3 | 2 | 2 |  |  | 4 | 3.5 |  |  |  | 6 |  | 3 |
| Farm Art | 4 |  | 2.5 |  | 1.5 |  | 3.5 | 1.5 | 2.5 | Y |  | 5 | 2 |

TABLE 1C

| NFT | Gi | Ei | Si | w1 | w2 | w3 | A | B | C | Valuation |
|---|---|---|---|---|---|---|---|---|---|---|
| Cropland | 7 | 8 | 9.5 | 0.33 | 0.33 | 0.33 | 2.31 | 2.64 | 3.135 | 8.085 |
| Farm produce | 8 | 6 | 8.5 | 0.1 | 0.5 | 0.4 | 0.8 | 3 | 3.4 | 7.2 |
| Farm diary | 7 | 7.5 | 9 | 0.15 | 0.4 | 0.45 | 1.05 | 3 | 4.05 | 8.1 |
| Farm Art | 8 | 7.5 | 7 | 0.7 | 0.15 | 0.15 | 5.6 | 1.125 | 1.05 | 7.775 |

In Table 1A and 1B, G1 to G5 are geophysical or geographical parameters, E1 to E4 are economical parameters and S1 to S4 are sustainability parameters. Gi, Ej and Sk in Table 1C reflects the integrated overall score for the individual elements of the attribute tuple obtained by summing the assigned values of corresponding parameters. Thus, Gi, Sj and Ek provide overall score by integrating the individual scores, for example in case of cropland from above the selected attributes will be, G1, G2, and G4; E1 and E3; and S1, S2 and S4 respectively.

Example Valuation of Cropland NFT:
  a) for i=1 to 'm' geophysical or geographical parameters: Geophysical importance of NFT of Cropland=f (g1, g2, g3, . . . , gm) where, g1 to gm (G1 to Gm) includes exact location of the land, availability of natural resources in the region such as water, soil texture/fertility, availability of resources and infrastructure such as availability of labor, roads, distance to market and various other parameters of significance can be added over time.
  b) for j=1 to 'n' economical parameters: Economical importance of NFT of Cropland=f (e1, e2, e3, . . . , en) where, e1 to en (E1 to En) includes quantity (yields in kg/ha), quality (grade) and market prices during the harvest of the produce.
  c) for k=1 to 'p' sustainability parameters: Sustainability importance of NFT of Cropland=f (s1, s2, s3, . . . , sp) where, s1 to sp (S1 to Sp) includes how well the practices have been followed over the Agri-land to minimize, reduce the GHGs.

Cropland valuation depends on the geophysical importance of the field, quality of farm management of this field over past "x years" in terms of cost-benefit analysis, and the sustainability of the farm and the farm management action. For the cropland valuation, as depicted in Table 2 below equal weightages are given to the attribute categories i.e. geophysical importance or score, economical value score, and sustainability score. So, each of these three categories will have weight of 0.333. But these weights can be configured and based on various scenarios they can have different weightage value too, giving a flexibility to the administrator and the users of the proposed system.

TABLE 2

| Field | Geophysical Imp. (overall score) (A = GiXw1) | Economical Value (overall score) (B = EiXw2) | Sustainable Score (overall score) (C = SiXw3) | Valuation of NFT (A + B + C) |
|---|---|---|---|---|
| F1 | 0.33 * 7 = 2.31 | 0.33 * 8 = 2.64 | 0.33 * 9 = 2.97 | 8.085 |
| F2 | 0.33 * 6 = 1.98 | 0.33 * 8 = 2.64 | 0.33 * 5 = 1.65 | 6.27 |
| F3 | 0.33 * 7 = 2.31 | 0.33 * 9 = 2.97 | 0.33 * 9 = 2.97 | 8.25 |
| F4 | 0.33 * 8 = 2.64 | 0.33 * 6 = 1.98 | 0.33 * 2 = 0.66 | 5.28 |

Example Valuation of Farm Diary NFT:
  a) for i=1 to 'm' geophysical parameters, Geophysical importance of NFT of Cropland=f (g1, g2, g3, . . . , gm) where, g1 to gm includes agro-climatic and agro-ecological zone for which the farm-diary is applicable, crop and variety for which the farm-diary has been generated, soil, season.
  b) for j=1 to 'n' economical parameters, Economical importance of NFT of Cropland=f (e1, e2, e3, . . . , en) where, e1 to en includes average regional yields obtained by following regular/traditional practices, and spatial-temporal yield pattern in the region, yields and monetary benefits obtained by following farm-diary, quality of the produce generated using the NFTed farm diary.
  c) for k=1 to 'p' sustainability parameters, Sustainability importance of NFT of Cropland=f (s1, s2, s3, . . . , sp) where, s1 to sp includes type of sustainable practices followed in the farm-diary, reductions, or removals of GHG from the farm Farm diary is the physical and/or digital recording of the farm management sequence of unique practices which are followed by the farmers which helps him to achieve the sustainable production (that is reduction or removal of greenhouse gas emissions such as carbon or methane and the higher and superior quality of yield). In the context of adverse effects of changing climate, as the focus would be to make the farming practices more sustainable practices, high weightage (0.45) will be given to sustainable score, followed by economical value (0.4) and less weightage will be given to geophysical importance (0.15).

TABLE 3

| Field | Geophysical Imp. (A) | Economical Value (B) | Sustainable Score (C) | Valuation (A + B + C) |
|---|---|---|---|---|
| F1 | 0.15 * 7 = 1.05 | 0.4 * 7.5 = 3 | 0.45 * 9 = 4.05 | 8.1 |
| F2 | 0.15 * 5.5 = 0.825 | 0.4 * 7 = 2.8 | 0.45 * 6 = 2.7 | 6.325 |
| F3 | 0.15 * 7.5 = 1.125 | 0.4 * 9 = 3.6 | 0.45 * 9.5 = 4.275 | 9 |
| F4 | 0.15 * 8.5 = 1.275 | 0.4 * 3 = 1.2 | 0.45 * 2 = 0.90 | 3.375 |

Example Valuation of Farm Produce NFT
  a) for i=1 to 'm' geophysical parameters, Geophysical importance of NFT of Cropland=f (g1, g2, g3, . . . , gm) where, g1 to gm includes exact location of the farm, distance to market
  b) for j=1 to 'n' economical parameters, Economical importance of NFT of Cropland=f (e1, e2, e3, . . . , en) where, e1 to en includes quantity (yields in kg/ha), quality (grade) and market prices during the harvest of the produce
  c) for k=1 to 'p' sustainability parameters, Sustainability importance of NFT of Cropland=f (s1, s2, s3, . . . , sp)

where, s1 to sp includes use of the Agri-inputs such as fertilizers, pesticides, water In the case of farm produce NFT, maximum weightage will be given to economic value (0.5), followed by sustainability score (0.4). Less weightage will be given geophysical importance (0.1).

TABLE 4

| Field | Geophysical Imp. (A) | Economical Value (B) | Sustainable Score (C) | Valuation (A + B + C) (Rank) |
|---|---|---|---|---|
| F1 | 0.10 * 8 = 0.80 | 0.50 * 6 = 3.0 | 0.40 * 8.5 = 3.4 | 7.2 |
| F2 | 0.10 * 5 = 0.5 | 0.50 * 7 = 3.5 | 0.40 * 5.5 = 2.2 | 6.2 |
| F3 | 0.10 * 8 = 0.8 | 0.50 * 9.5 = 4.75 | 0.40 * 9.5 = 3.8 | 9.35 |
| F4 | 0.10 * 8.5 = 0.85 | 0.50 * 3 = 1.5 | 0.40 * 1.5 = 0.6 | 2.95 |

Example Valuation of Farm Art NFT a) for i=1 to 'm' geophysical parameters: Geophysical importance of NFT of Cropland=f (g1, g2, g3, . . . , gm) where, g1 to gm includes geo-location and its surrounding in terms of river, mountains if any, crops grown, other assets farmer possess such as well, animals b) for j=1 to 'n' economical parameters: Economical importance of NFT of Cropland=f (e1, e2, e3, . . . , en) where, e1 to en includes crop quantity (yields in kg/ha), quality (grade)

c) for k=1 to 'p' sustainability parameters: Sustainability importance of NFT of Cropland=f (s1, s2, s3, . . . , sp) where, s1 to sp practices followed on the agricultural land during the season In case of farm art, aesthetic view, or positions of various things in the surrounding matters hence higher weightage is given to geophysical importance (0.7), however less weightages is given to economic value (0.15) and sustainability score (0.15).

TABLE 5

| Field | Geophysical Imp. (A) | Economical Value (B) | Sustainable Score (C) | Valuation (A + B + C) (Rank) |
|---|---|---|---|---|
| F1 | 0.70 * 8 = 5.60 | 0.15 * 7.5 = 1.125 | 0.15 * 7 = 1.05 | 7.775 |
| F2 | 0.70 * 5.5 = 3.85 | 0.15 * 7.5 = 1.125 | 0.15 * 6 = 0.90 | 5.875 |
| F3 | 0.70 * 7 = 4.90 | 0.15 * 9 = 1.35 | 0.15 * 9 = 1.35 | 7.60 |

TABLE 5-continued

| Field | Geophysical Imp. (A) | Economical Value (B) | Sustainable Score (C) | Valuation (A + B + C) (Rank) |
|---|---|---|---|---|
| F4 | 0.70 * 7.5 = 5.25 | 0.15 * 3.5 = 0.525 | 0.15 * 1.5 = 0.225 | 6 |

Table 5 depicts example Computation of Valuation for field F1 for various NFTs generated from the field F1

Royalty estimation for NFT of Agri-land (cropland): NFT associated with Agri-land will be owned by various owners during the life of the Agri-land, however traditional system of providing the royalty to the first owner does not make sense in this case. The method enables generating the dynamic and performance-based reward/royalty mechanism to one or multiple NFT owners. For each NFT owner, depending on the period for which they own the NFT, crops grown, yields obtained, soil health, use of sustainable practices and the value of NFT at which they brought the same will be considered to estimate the royalty score for each NFT. Depending upon the scores royalties will be estimated and provided to the one or more NFT owners from the past.

Royalty estimation for NFT of Farm Diary: Royalty for the NFT of the farm diary will be estimated dynamically based on the performance of the current NFT owner. The method considers parameters such as yield obtained, profits received, soil health and sustainability achieved etc. to estimate the % increase in the gains as compared to his traditional way of working and % increase in gains will be used for estimating the royalty amount.

Royalty estimation for NFT of Farm-Art: In the case of Farm-Art, royalty will be decided by the creator, and this would be static in nature. For each NFT transaction, a certain % sellable value will be given to NFT creator (first NFT owner) as a royalty.

Royalty Estimation with Example for 4 Individual NFT Owners

1. Royalty Estimation of Cropland NFT

Step 1: Define Parameters

1. Ownership Period: The number of years each owner possessed the farmland.

2. Crops Grown: No. and the types of crops each owner cultivated during their ownership period.

3. Yields Obtained: The average yield (in kg/acre) of each crop during each owner's tenure.

4. Soil Health: A subjective score (out of 10) representing the overall health and fertility of the soil during each owner's period.

5. Sustainable Practices: A binary value (0 or 1) indicating whether sustainable practices were employed (1) or not (0) during each owner's ownership period.

6. Acquisition Value: The amount at which each owner acquired the farmland.

Step 2: Owner and Example Parameter Values

TABLE 6

| Parameters | Ownership Period (To) | Crops Grown (Cg) | Yields Obtained (Y) | Soil Health (SH) | Sustainable Practices (SP) | Acquisition Value (AV) |
|---|---|---|---|---|---|---|
| Owner 1 | 5 years | Wheat, Corn, Soybean | Wheat—2000 kg/acre, Corn—2500 kg/acre, Soybean—1800 kg/acre | 8 | 1 (Yes, sustainable practices were employed) | 200000 |
| Owner 2 | 3 years | Rice, Barley | Rice—3000 kg/acre, Barley—2200 kg/acre | 7 | 1 (Yes, sustainable practices were employed) | 150000 |

TABLE 6-continued

| Parameters | Ownership Period (To) | Crops Grown (Cg) | Yields Obtained (Y) | Soil Health (SH) | Sustainable Practices (SP) | Acquisition Value (AV) |
|---|---|---|---|---|---|---|
| Owner 3 | 4 years | Wheat, Corn, Oats | Wheat—1800 kg/acre, Corn—2400 kg/acre, Oats—1500 kg/acre | 6 | 0 (No, sustainable practices were not employed) | 180000 |
| Owner 4 | 3 years | Barley, Soybean | Barley—2100 kg/acre, Soybean—1900 kg/acre | 9 | 1 (Yes, sustainable practices were employed) | 220000 |

Step 3: Estimation of Royalty Score for Each Ownership

Royalty Score = $f$(Ownership Period Score, Crop Yield Score,

Soil Health Score, Sustainable Practices Score, Value Score)

Royalty Score = $w1$ * Ownership Period Score +

$w2$ * Crop Yield Score + $w3$ * Soil Health Score +

$w4$ * Sustainable Practices Score + $w5$ * Value Score

Where, a. Ownership Period Score =

(Ownership Period/Maximum Ownership Period) * Weightage b. Crop Yield Score =

(Average Yield of Crops/Maximum Yield of Crops) * Weightage c. Soil Health Score =

(Soil Health Score/Maximum Soil Health Score) * Weightage d. Sustainable Practices Score = (Sustainable Practices/1) * Weightage e. Value Score =

(Acquisition Value/Maximum Acquisition Value) * Weightage

For simplicity, assume the maximum values for each parameter as follows:

Maximum Ownership Period: 5 years (the longest ownership period among all owners)

Maximum Yield of Crops: 3000 kg/acre (the highest yield among all crops)

Maximum Soil Health Score: 10

Maximum Acquisition Value: 220,000 (the highest acquisition value among all owners)

Assumption: weightage has been assumed to be equal for all the score i.e., 1 out of 5 (1/5=20%).

Owner 1:

Ownership Period Score: $(5/5) * (1/5) = 1/5$

Crop Yield Score: $[(2000 + 2500 + 1800)/(3 * 3000)] * (1/5) \approx 0.467$

Soil Health Score: $(8/10) * (1/5) = 0.16$

Sustainable Practices Score: $(1/1) * (1/5) = 1/5$

Value Score: $(200,000/220,000) * (1/5) \approx 0.909$

Royalty Score for Owner 1 $\approx (1/5 + 0.467 + 0.16 + 1/5 + 0.909)/5 \approx 0.541$ Similarly, Royalty Score for Owner 2: 0.263

Royalty Score for Owner 3: 0.197

Royalty Score for Owner 4: 0.275

2. Royalty Estimation of Farm Diary NFT

Consider a scenario where Owner 1 creates a unique farm diary, and then this could be sold to three other owners or Owners (2, 3, and 4) subsequently, leading to improvements in their agricultural practices.

For each Owner (2, 3, and 4), the following parameters are noted:

1. Yield Increase: The percentage increase in crop yield obtained by following Owner 1's farm diary as compared to their traditional practices.

2. Profit Increase: The percentage increase in profits received by following Owner 1's farm diary as compared to their traditional practices.

3. Soil Health Improvement: A subjective score representing the overall improvement in soil health by following Owner 1's farm diary as compared to their traditional practices (on a scale of 1 to 10).

4. Sustainability Improvement: A subjective score representing the overall improvement in sustainable practices by following Owner 1's farm diary as compared to their traditional practices (on a scale of 1 to 10).

Owner 1 and corresponding parameter values. Please note these are example values from concept illustration perspective

TABLE 7

| Parameters | Yield Increase | Profit Increase | Soil Health Improvement | Sustainability Improvement |
|---|---|---|---|---|
| Owner 2 | 20% | 15% | 7 | 8 |
| Owner 3 | 25% | 10% | 6 | 7 |
| Owner 4 | 18% | 20% | 9 | 9 |

Step 1: Calculate the Overall Improvement Score for each owner: To calculate the overall improvement score for each owner, Overall Improvement Score = (Yield Increase + Profit Increase)/2

Step 2: Calculate the Sustainability Score for each owner: To calculate the sustainability score for each owner, $$\text{Sustainability Score} =$$
$$(\text{Soil Health Improvement} + \text{Sustainability Improvement})/2$$

Step 3: Calculate the % Increase in Gains for each owner: To calculate the percentage increase in gains for each owner, we can use the Overall Improvement Score and Sustainability Score:

$$\% \text{ Increase in Gains} =$$
$$(\text{Overall Improvement Score} + \text{Sustainability Score})/2$$

TABLE 8

| | Overall Improvement Score | Sustainability Score | % Increase in Gains |
|---|---|---|---|
| Owner 2 | 35% | 7.5 | 21.25% |
| Owner 3 | 17.5% | 6.5 | 12% |
| Owner 4 | 19% | 9 | 14% |

These % increase in gains values represent the improvements achieved by each owner (B, C, and D) by following Owner 1's farm diary as compared to their traditional practices. These values can be used to estimate the royalty amount that Owner 1 may receive for sharing the beneficial farm diary with the other owners.

3. Royalty Estimation of Farm Art NFT

In the case of Farm-Art, royalty will be decided by the creator, and this would be static in nature. For each NFT transaction, a certain % sellable value will be given to NFT creator (first NFT owner) as a royalty.

$$\text{Royalty} = f(\text{sellable value, royalty percentage})$$

Consider three owners A, B and C. Owner 1 has created the farm art NFT and that has been sold to B. Further, B sells it C at a price of Rs. 10000. Also assume that Owner 1 has decided the royalty percentage of 2% on each transaction. Then in this case Owner 1 gets
Royalty=10000*0.02=Rs 200 on each transaction.
Each owner who has created farm art NFT can decide this royalty percentage depending on his farm art.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor implemented method comprising:

receiving, via one or more hardware processors of an agricultural asset valuation server, a request for at least one of a) valuation of a Non-Fungible Token (NFT) created for an agricultural asset from among a plurality of NFTs created for a plurality of agricultural assets owned by a current owner, and b) computing a royalty to be received by the current owner and one or more previous owners of the NFT, wherein the plurality of NFTs belong to a plurality of NFT types, and wherein the NFT is tagged as a royalty generating NFT if one or more activities associated with the agricultural asset associated with the NFT are of non-consumable nature;

dynamically generating, via the one or more hardware processors of the agricultural asset valuation server, an attribute tuple for the NFT, wherein the attribute tuple comprising a geographical attribute (G), an economical attribute (E), and a sustainability attribute recorded for the agricultural asset associated with the NFT, wherein each of the geographical attribute, the economical attribute, and the sustainability attribute comprises a plurality of parameters, wherein the plurality of parameters of the geographical attribute of the NFT includes a location of the agricultural field, agro-ecological and agro-climatic zone, soil, elevation, distance to market, availability of natural resources, availability to infrastructure, aesthetic features available in the surrounding, wherein the plurality of parameters of the economical attribute include a quantity, quality, market prices during the harvest of the produce, monetary benefits achieved from the land by selling of specific NFT, percentage increase in the yield, wherein the plurality of parameters of the sustainability attribute include sustainable practices followed over the land, soil health, reduction, or removal of Green House Gases (GHGs), optimal use of natural resources, quality of the produce generated, wherein a current status of each of the plurality of parameters is sourced dynamically from a plurality of external sources to enable performance based valuation, wherein the plurality of external sources includes on-field sensors, satellite sensors, a flying or moving sensor, plant or crop sensors, crowdsourcing, openly available data about regional yields;

assigning, via the one or more hardware processors of the agricultural asset valuation server, an individual score to each of the plurality of parameters available within the geographical attribute, the economical attribute, and the sustainability attribute based on relevancy of an attribute to a NFT type of the NFT and the cropland with which the NFT is associated, wherein the relevancy in accordance with the NFT type for each parameter within the geographical attribute, the economical attribute, and the sustainability attribute is configured in a first look up table that is reconfigured periodically;

integrating, via the one or more hardware processors of the agricultural asset valuation server, the individual scores for each of the plurality of parameters within the geographical attribute, the economical attribute, and the sustainability attribute to generate an overall score associated with each element G, E, and S of the attribute tuple;

assigning, via the one or more hardware processors of the agricultural asset valuation server, a weightage to each element of the attribute tuple based on the NFT type of the NFT from among the plurality of NFT types and significance of each element of the attribute tuple for the NFT type, wherein, if the type of NFT is a cropland, each element G, E, and S of the attribute tuple is provided equal significance and the assigned weightage is equally distributed among each element G, E, and S of the attribute tuple, wherein, if the type of NFT is a farm produce, element E has highest significance followed by element S and element G of the attribute tuple and assigned weightage decreases from E, S to G elements of the attribute tuple, wherein, if the type of NFT is a farm diary, element G and element S of the attribute tuple are provided higher significance as compared to element E and assigned weightage decreases from S, G to E elements of the attribute tuple, and wherein, if the type of NFT is a farm art, element G is provided highest significance as compared to element E and element S, and assigned weightage is highest to G element and equal to the S and E elements of the attribute tuple, wherein the weightage to each element of the attribute tuple is dynamically updated over time based on the plurality of parameters and a subject matter expert;

computing, via the one or more hardware processors of the agricultural asset valuation server, a valuation of the NFT as a weighted sum of the attribute tuple based on the integrated overall score of each element G, E and S of the attribute tuple weighed by the assigned weightage;

estimating, via the one or more hardware processors (104) of the agricultural asset valuation server (206), performance based royalty for the NFT based on the computed valuation of the NFT every time the NFT is purchased or sold, the performance based rovalty to be distributed among the current owner and the one or more previous owners if the NFT is tagged as the royalty generating NFT, wherein if the type of the NFT is the cropland the royalty is provided to each of the current owner and the one or more previous owners based on an ownership period for the NFT, productivity of the cropland and maintenance of the cropland, use of sustainable practices and a price for which the NFT has been bought, wherein if the type of the NFT is the farm diary the royalty is provided to the current owner based on percentage increase in gains from the agricultural asset associated with the NFT as a result of one or more unique practices as compared to routine practices of working with the agricultural asset, and wherein if the type of the NET is the farm art the royalty is provided statically to an owner of the NFT who is identified as creator of the farm art, wherein for each NFT owner depending on the period for which they own the NFT, crops grown, yields obtained, soil health, use of sustainable practices and the value of NFT at which they brought the same will be considered to estimate the royalty score for each NFT; and performing, via a financial transaction server (208), NFT based trading based on the valuation of the NFT and the performance based royalty for the NFT.

2. The method of claim 1, wherein the plurality of parameters of the geographical attribute, the economical attribute, and the sustainability attribute to be considered for the type of NFT are predefined.

3. The method of claim 1, wherein the weightage assigned to each of the element of the attribute tuple is configured in a second a look up table that is reconfigured periodically, wherein the weight varies from 0 to 1 with an aggregated weightage of the elements G, E and S of the attribute tuple for the NFT type equal to 1.

4. The method of claim 1, wherein the plurality of agricultural assets of the current owner comprises at least one cropland from which the farm produce is obtained, the farm diary is maintained, and the farm art is created.

5. A system comprising:

a digital asset server generating a plurality of digital assets for a plurality of agricultural assets, a NFT Digital Exchange server having a NFT wallet for creating a plurality of Non-Fungible Tokens (NFTs) for the plurality of digital assets, an agricultural asset valuation server, a financial transaction server, and a Royalty Estimator Node, each of the plurality of components comprising:

a memory storing instructions;

one or more Input/Output (I/O) interfaces; and one or more hardware processors coupled to the memory via the one or more I/O interfaces, wherein the one or more hardware processors are configured by the instructions to:

receive via the agricultural asset valuation server, a request for at least one of a) valuation of a NFT created for an agricultural asset from among the plurality of NFTs created for the plurality of agricultural assets owned by a current owner, and b) computing a royalty to be received by the current owner and one or more previous owners of the NFT, wherein the plurality of NFTs belong to a plurality of NFT types, and wherein the NFT is tagged as a royalty generating NFT if one or more activities associated with the agricultural asset associated with the NFT are of non-consumable nature;

dynamically generate via the agricultural asset valuation server, an attribute tuple for the NFT, wherein the attribute tuple comprising a geographical attribute (G), an economical attribute (E), and a sustainability attribute recorded for the agricultural asset associated with the NFT, wherein each of the geographical attribute, economical attribute, and the sustainability attribute comprises a plurality of parameters, wherein the plurality of parameters of the geographical attribute of the NFT, includes a location of the agricultural field, agro-ecological and agro-climatic zone, soil, elevation, distance to market, availability of natural resources, availability to infrastructure, aesthetic features available in the surrounding, wherein the plurality of parameters of the economical attributes include a quantity, quality, market prices during the harvest of the produce, monetary benefits achieved from the land by selling of specific NFT, percentage increase in the yield, wherein the plurality of parameters of sustainability attribute include sustainable practices followed over the land, soil health, reduction, or removal of Green House Gases (GHGs), optimal use of natural resources, quality of the produce generated, wherein a current status of each of the plurality of parameters is sourced dynamically from a plurality of external sources to enable performance based valuation, wherein the plurality of external sources includes on-field sensors, satellite sensors, a flying or moving sensor, plant or crop sensors crowdsourcing, openly available data about regional yields;

assign via the agricultural asset valuation server, an individual score to each of the plurality of parameters available within the geographical attribute, the economical attribute, and the sustainability attribute based on relevancy of an attribute to a NFT type of the NFT and the cropland with which the NFT is associated, wherein the relevancy in accordance with the NFT type for each parameter within the geographical attribute, the economical attribute, and the sustainability attribute is configured in a first look up table that is reconfigured periodically;

integrate via the agricultural asset valuation server, the individual scores for each of the plurality of parameters within the geographical attribute, the economical attribute, and the sustainability attribute to generate an overall score associated with each element G, E, and S of the attribute tuple;

assign via the agricultural asset valuation server, a weightage to each element of the attribute tuple based on the NFT type of the NFT from among the plurality of NFT types and significance of each element of the attribute tuple for the NFT type, wherein, if the type of NFT is a cropland, each element G, E, and S of the attribute tuple is provided equal significance and the assigned weightage is equally distributed among each element G, E, and S of the attribute tuple, wherein, if the type of NFT is a farm produce, element E has highest significance followed by element S and element G of the attribute tuple and assigned weightage decreases from E, S to G elements of the attribute tuple, wherein, if the type of NFT is a farm diary, element G and element S of the attribute tuple are provided higher significance as compared to element E and assigned weightage decreases from S, G to E elements of the attribute tuple, and wherein, if the type of NFT is a farm art, element G is provided highest significance as compared to element E and element S, and assigned weightage is highest to G element and equal to the S and E elements of the attribute tuple, wherein the weightage to each element of the attribute tuple is dynamically updated over time based on the plurality of parameters and subject matter expert;

compute via the agricultural asset valuation server, a valuation of the NFT as a weighted sum of the attribute tuple based on the integrated overall score of each element G, E and S of the attribute tuple weighed by the assigned weightage;

estimate, via the agricultural asset valuation server (206), performance based royalty for the NFT based on the computed valuation of the NFT every time the NFT is purchased or sold, the performance based royalty to be distributed among the current owner and the one or more previous owners if the NFT is tagged as the royalty generating NFT, wherein if the type of the NFT is the cropland the royalty is provided to each of the current owner and the one or more previous owners based on an ownership period for the NFT, productivity of the cropland and maintenance of the cropland, use of sustainable practices and a price for which the NFT has been bought, wherein if the type of the NFT is the farm diary the royalty is provided to the current owner based on percentage increase in gains from the agricultural asset associated with the NFT as a result of one or more unique practices as compared to routine practices of working with the agricultural asset, and wherein if the type of the NFT is the farm art the royalty is provided statically to an owner of the NFT who is identified as creator of the farm art, wherein for each NFT owner depending on the period for which they own the NFT, crops grown, yields obtained, soil health, use of sustainable practices and the value of NFT at which they brought the same will be considered to estimate the royalty score for each NFT; and perform, via the financial transaction server (208), NFT based trading based on the valuation of the NFT and the performance based royalty for the NFT.

6. The system of claim 5, wherein the plurality of parameters of the geographical attribute, the economical attribute, and the sustainability attribute to be considered for the type of NFT are predefined.

7. The system of claim 5, wherein the weightage assigned to each of the element of the attribute tuple is configured in a second a look up table that is reconfigured periodically, wherein the weight varies from 0 to 1 with an aggregated weightage of the elements G, E and S of the attribute tuple for the NFT type equal to 1.

8. The system of claim 5, wherein the plurality of agricultural assets of the current owner comprises at least one cropland from which the farm produce is obtained, the farm diary is maintained, and the farm art is created.

9. The system of claim 5, wherein the royalty estimation node generates valuation report and royalty reports for the received request.

10. One or more non-transitory machine-readable information storage mediums comprising one or more instructions which when executed by one or more hardware processors cause:

receiving, a request for at least one of a) valuation of a Non-Fungible Token (NFT) created for an agricultural asset from among a plurality of NFTs created for a plurality of agricultural assets owned by a current owner, and b) computing a royalty to be received by the current owner and one or more previous owners of the NFT, wherein the plurality of NFTs belong to a plurality of NFT types, and wherein the NFT is tagged as a royalty generating NFT if one or more activities associated with the agricultural asset associated with the NFT are of non-consumable nature;

dynamically generating, an attribute tuple for the NFT, wherein the attribute tuple comprising a geographical attribute (G), an economical attribute (E), and a sustainability attribute recorded for the agricultural asset associated with the NFT, wherein each of the geographical attribute, the economical attribute, and the sustainability attribute comprises a plurality of parameters, wherein the plurality of parameters of the geographical attribute of the NFT includes parameters a location of the agricultural field, agro-ecological and agro-climatic zone, soil, elevation, distance to market, availability of natural resources, availability to infrastructure, aesthetic features available in the surrounding, wherein the plurality of parameters of the economical attribute include a quantity, quality, market prices during the harvest of the produce, monetary benefits achieved from the land by selling of specific NFT, percentage increase in the yield, wherein the plurality of parameters of the sustainability attributes include sustainable practices followed over the land, soil health, reduction, or removal of Green House Gases (GHGs), optimal use of natural resources, quality of the produce generated, wherein a current status of each of the plurality of parameters is sourced dynamically from a plurality of external sources to enable performance based valuation, wherein the plurality of external sources includes on-field sensors, satellite sensors, a flying or moving sensor, plant or crop sensors about various farming activities, data obtained from the farmers via crowdsourcing, openly available data about regional yields;

assigning, an individual score to each of the plurality of parameters available within the geographical attribute, the economical attribute, and the sustainability attribute based on relevancy of an attribute to a NFT type of the NFT and the cropland with which the NFT is associated, wherein the relevancy in accordance with the NFT type for each parameter within the geographical attribute, the economical attribute, and the sustainability attribute is configured in a first look up table that is reconfigured periodically;

integrating, the individual scores for each of the plurality of parameters within the geographical attribute, the economical attribute, and the sustainability attribute to generate an overall score associated with each element G, E, and S of the attribute tuple;

assigning, a weightage to each element of the attribute tuple based on the NFT type of the NFT from among the plurality of NFT types and significance of each element of the attribute tuple for the NFT type, wherein, if the type of NFT is a cropland, each element G, E, and S of the attribute tuple is provided equal significance and the assigned weightage is equally distributed among each element G, E, and S of the attribute tuple, wherein, if the type of NFT is a farm produce, element E has highest significance followed by element S and element G of the attribute tuple and assigned weightage decreases from E, S to G elements of the attribute tuple, wherein, if the type of NFT is a farm diary, element G and element S of the attribute tuple are provided higher significance as compared to element E and assigned weightage decreases from S, G to E elements of the attribute tuple, and wherein, if the type of NFT is a farm art, element G is provided highest significance as compared to element E and element S, and assigned weightage is highest to G element and equal to the S and E elements of the attribute tuple, wherein the weightage to each element of the tuple is dynamically updated over time based on the plurality of parameters and subject matter expert;

computing, a valuation of the NFT as a weighted sum of the attribute tuple based on the integrated overall score of each element G, E and S of the attribute tuple weighed by the assigned weightage;

estimating performance based royalty for the NFT based on the computed valuation of the NFT every time the NFT is purchased or sold, the performance based royalty to be distributed among the current owner and the one or more previous owners if the NFT is tagged as the royalty generating NFT, wherein if the type of the NFT is the cropland the royalty is provided to each of the current owner and the one or more previous owners based on an ownership period for the NFT, productivity of the cropland and maintenance of the cropland, use of sustainable practices and a price for which the NET has been bought, wherein if the type of the NFT is the farm diary the royalty is provided to the current owner based on percentage increase in gains from the agricultural asset associated with the NFT as a result of one or more unique practices as compared to routine practices of working with the agricultural asset, and wherein if the type of the NFT is the farm art the royalty is provided statically to an owner of the NFT who is identified as creator of the farm art, wherein for each NFT owner depending on the period for which they own the NFT, crops grown, yields obtained, soil health, use of sustainable practices and the value of NFT at which they brought the same will be considered to estimate the royalty score for each NFT; and performing NFT based trading based on the valuation of the NFT and the performance based royalty for the NFT.

11. The one or more non-transitory machine readable information storage mediums of claim 10, wherein the plurality of parameters of the geographical attribute, the economical attribute, and the sustainability attribute to be considered for the type of NFT are predefined.

* * * * *